United States Patent
Boutselis et al.

(10) Patent No.: US 12,067,124 B2
(45) Date of Patent: Aug. 20, 2024

(54) SYSTEMS AND METHODS FOR NODE SELECTION AND RANKING IN CYBER-PHYSICAL SYSTEMS

(71) Applicant: GENERAL ELECTRIC COMPANY, Schenectady, NY (US)

(72) Inventors: Georgios Boutselis, Niskayuna, NY (US); Masoud Abbaszadeh, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 330 days.

(21) Appl. No.: 17/479,370

(22) Filed: Sep. 20, 2021

(65) Prior Publication Data
US 2023/0093713 A1    Mar. 23, 2023

(51) Int. Cl.
*G06F 21/57*    (2013.01)
*G06F 16/2457*    (2019.01)

(52) U.S. Cl.
CPC ...... *G06F 21/577* (2013.01); *G06F 16/24578* (2019.01); *G06F 2221/034* (2013.01)

(58) Field of Classification Search
CPC ............. G06F 21/577; G06F 16/24578; G06F 2221/034; G06F 21/554
See application file for complete search history.

(56) References Cited

U.S. PATENT DOCUMENTS

| | | | |
|---|---|---|---|
| 9,208,323 B1* | 12/2015 | Karta | G06F 21/577 |
| 10,386,224 B2* | 8/2019 | Shim | G01L 1/205 |
| 10,417,415 B2 | 9/2019 | Abbaszadeh et al. | |
| 10,771,495 B2* | 9/2020 | Mestha | H04L 63/1416 |
| 10,819,725 B2 | 10/2020 | Abbaszadeh et al. | |
| 11,082,870 B2* | 8/2021 | Kleinbeck | H04B 17/26 |
| 2018/0159890 A1* | 6/2018 | Warnick | H04L 63/1433 |
| 2023/0025695 A1* | 1/2023 | Zhou | G06F 21/577 |
| 2023/0032249 A1* | 2/2023 | Irving | G06F 21/577 |

OTHER PUBLICATIONS

Search Report and Written Opinion issued for corresponding International patent Application No. PCT/US2022/076711, dated Feb. 1, 2023, 7 pages.

* cited by examiner

*Primary Examiner* — Abiy Getachew
(74) *Attorney, Agent, or Firm* — Morgan, Lewis & Bockius LLP

(57) ABSTRACT

The present application describes techniques for node selection and ranking for, e.g., attack detection and localization in cyber-physical systems, without relying on digital twins, computer models of assets, or operational domain expertise. The described techniques include obtaining an input dataset of values for a plurality of nodes (e.g., sensors, actuators, controllers, software nodes) of industrial assets, computing a plurality of principal components (PCs) for the input dataset according to variance of values for each node, computing a set of common weighted PCs based on the plurality of PCs according to variance of each PC, and ranking each node based on the node's contribution to the set of common weighted PCs.

20 Claims, 33 Drawing Sheets

300 ↘

302 ↘

304 ↘

306 ↘

400 ⤹

402 ⤹

404 ⤴

Percentage of error on normal detection - nodes selected: 13

406 ⤴

Percentage of error on attack detection - nodes selected: 13

500 ↘

502 ↘

504 →

Percentage of error on normal detection - nodes selected: 22

506 →

Percentage of error on attack detection - nodes selected: 22

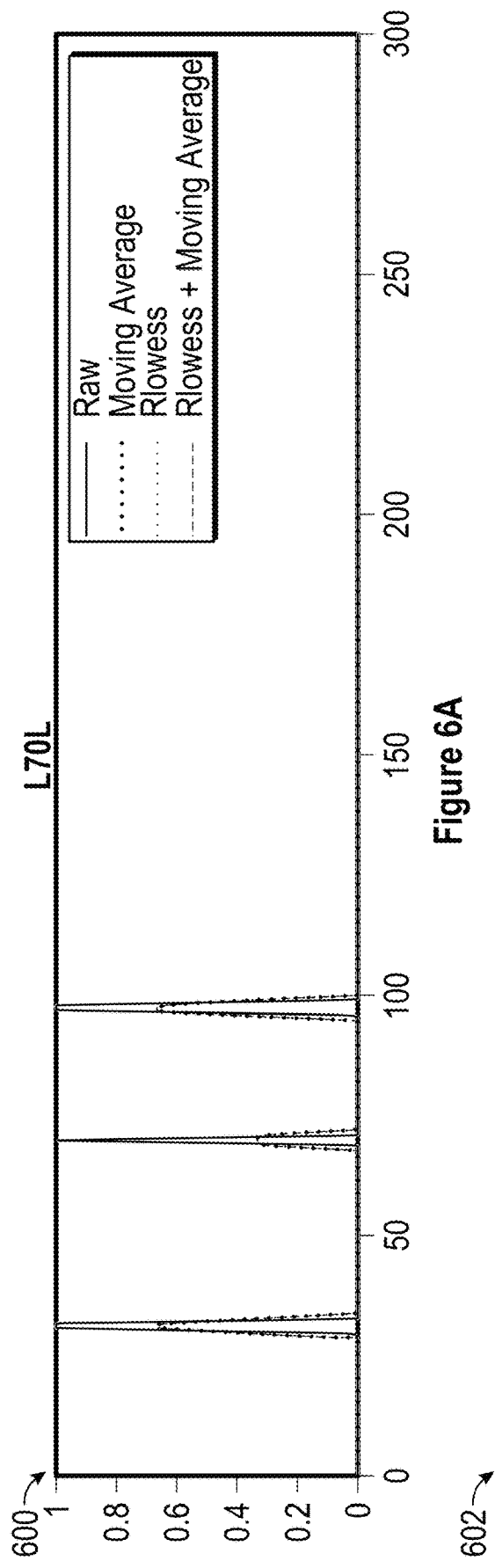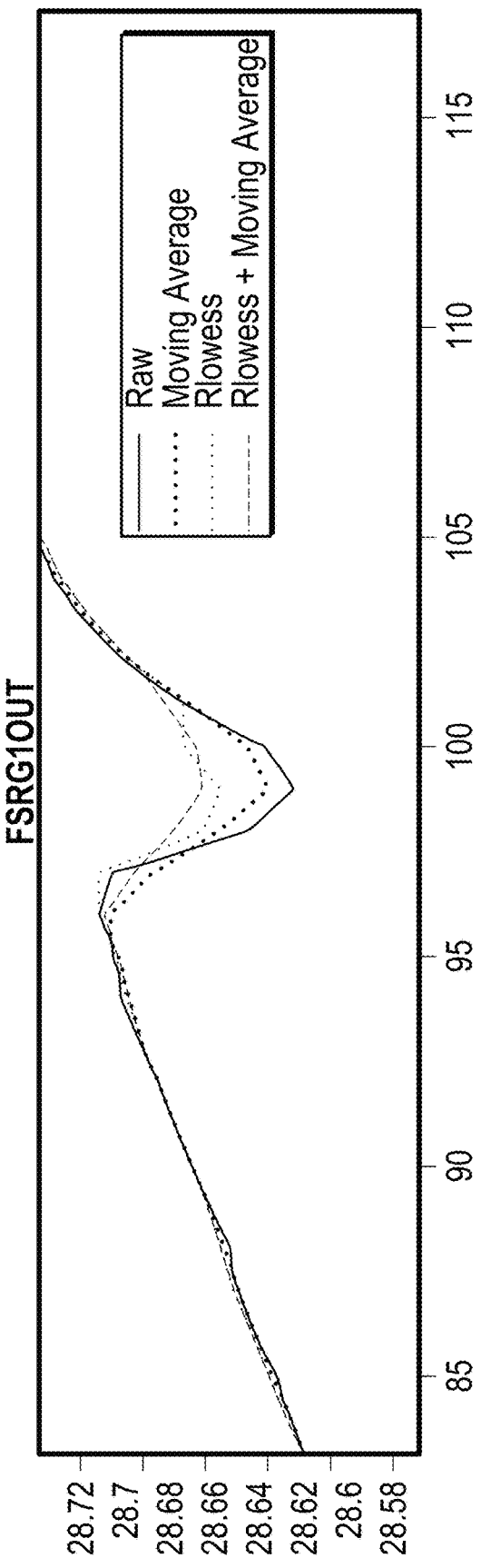

SYSTEMS AND METHODS FOR NODE SELECTION AND RANKING IN CYBER-PHYSICAL SYSTEMS

TECHNICAL FIELD

The disclosed implementations relate generally to cyber-physical systems and more specifically to systems and methods for node selection and ranking in cyber-physical systems.

BACKGROUND

Cyber-attacks have become increasingly common. Industrial assets have been disabled, damaged, or even destroyed by malicious cyber actors. Anomaly (cyberattack or fault) detection and localization methods use data collected from monitoring nodes, including signals from critical sensors, controller nodes, actuators, and/or key software nodes, for monitoring occurrences of cyber-threats or abnormal events. However, selection of a monitoring node is a cumbersome task, traditionally performed using trial and error methods and domain knowledge. Some solutions rely on digital twins, or sophisticated computer models, for data generation, and require domain expertise in the associated control systems.

SUMMARY

Accordingly, there is a need for systems and methods for automatic (or semi-automatic) selection and ranking of nodes in a cyber-physical system. For example, after ranking the nodes in a cyber-physical system, one or more of the high-ranking nodes may be used as inputs to anomaly detection systems or as hardened nodes to be the anchors for neutralization signal reconstruction (e.g. virtual sensors). Some anomaly detection and neutralization systems in which the node selection and ranking described herein may be implemented are described in U.S. Pat. No. 10,819,725, titled "Reliable Cyber-Threat Detection in Rapidly Changing Environments," U.S. Pat. No. 10,417,415, titled "Automated Attack Localization And Detection Using Feature Driven Dynamic Model," and U.S. Pat. No. 10,771,495, titled "Cyber-Attack Detection and Neutralization," each of which is incorporated herein by reference in its entirety.

The techniques described herein use data-driven methods and field data, e.g., without relying on digital twins, computer models of assets, or operational domain expertise. At a high level, the system performs dimensionality reduction to select a subset of nodes from a large number of nodes in industrial assets. The system preserves variability of original or input dataset, and uses principal component analysis (PCA) for performing ranking and selection of nodes based on the preserved variability. In some embodiments, however, the techniques described herein are implemented along with a digital twin on an asset. For example, in many systems, there are many sensors and actuators and even with digital twin simulations, not all nodes of the system can be monitored. In that regard, the techniques of the present disclosure may be used to select a subset of nodes using node ranking. Without such techniques, the process of node ranking and selection remains a cumbersome manual process that requires extensive domain knowledge.

In one aspect, some implementations include a computer-implemented method for implementing a node selection and ranking as applieable to cyber-physical and industrial control systems. The method includes obtaining an input dataset of values for a plurality of nodes (e.g., sensors, actuators, controllers, software nodes) of industrial assets. The method also includes computing a plurality of principal components (PCs) for the input dataset according to variance of values for each node. The method also includes computing a set of common weighted PCs based on the plurality of PCs according to variance of each PC. The method further includes ranking each node based on the node's contribution to the set of common weighted PCs.

In another aspect, a system configured to perform any of the above methods is provided, according to some implementations.

In another aspect, a non-transitory computer-readable storage medium has one or more processors and memory storing one or more programs executable by the one or more processors. The one or more programs include instructions for performing any of the above methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 6A and 6B show graph plots that show effect of filtering, according to some implementations.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
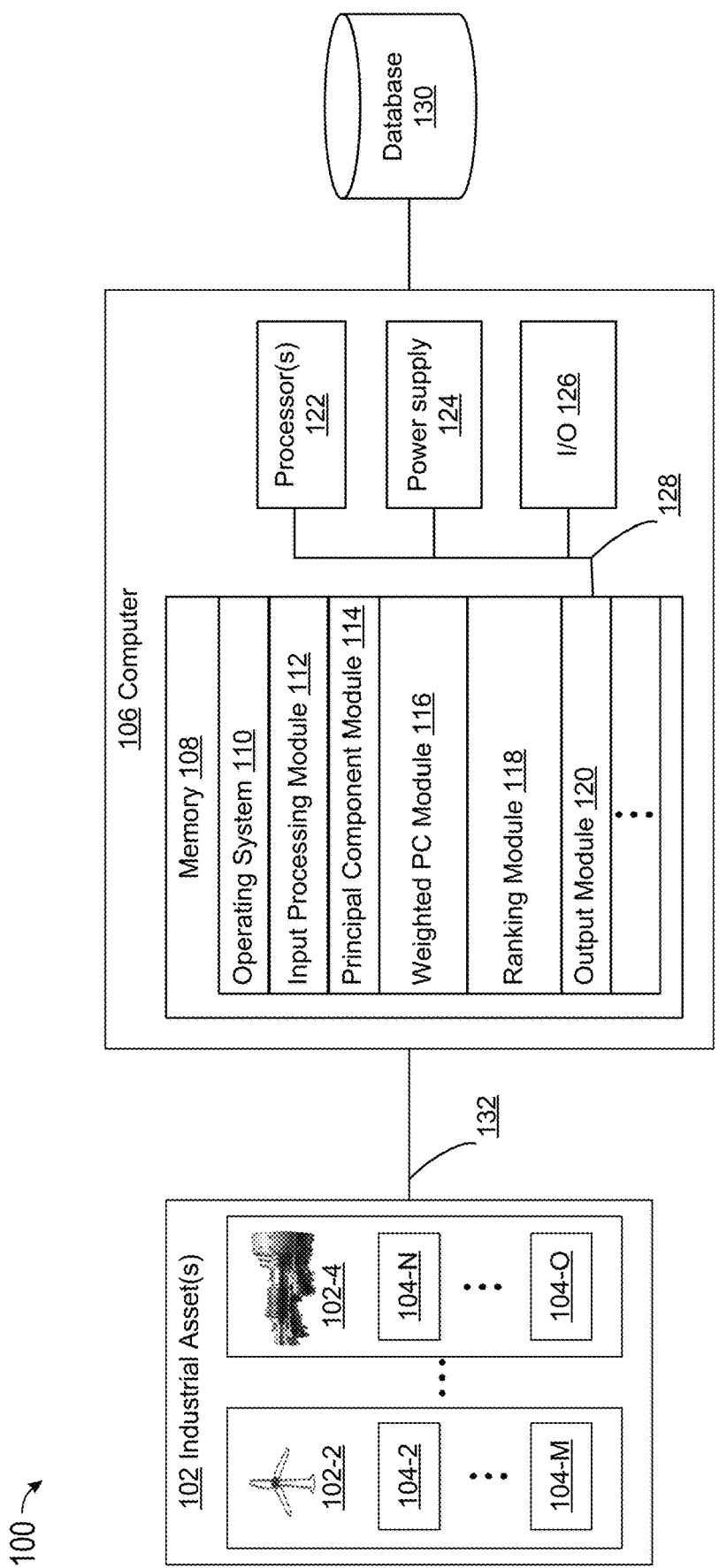
FIG. 1 is a block diagram of an example system for automatic node selection and ranking, according to some implementations.

FIG. 1 is a block diagram of an example system 100 for automatic node selection ranking and selection, according to some implementations. The system 100 includes one or more industrial assets 102 (e.g., a wind turbine engine 102-2, a gas turbine engine 102-4) that include a plurality of nodes 104 (e.g., nodes 104-2, . . . , 104-M, and nodes 104-N, . . . , 104-0). In practice, the industrial assets 102 may include an asset community including several industrial assets. It should be understood that wind turbines and gas turbine engines are merely used as non-limiting examples of types of assets that can be a part of, or in data communication with, the rest of the system 100. Examples of other assets include steam turbines, heat recovery steam generators, balance of plant, healthcare machines and equipment, aircraft, locomotives, oil rigs, manufacturing machines and equipment, textile processing machines, chemical processing machines, mining equipment, and the like. Additionally, the industrial assets may be co-located or geographically distributed and deployed over several regions or locations (e.g., several locations within a city, one or more cities, states, countries, or even continents). The plurality of nodes 104 may include sensors, actuators, controllers, software nodes. The plurality of nodes 104 may not be physically co-located or may be communicatively coupled via a network (i.e., wired or wireless network, such as an IoT over 5G/6G or Wi-Fi 6). The industrial assets 102 are communicatively coupled to a computer 106 via communication link(s) 132 that may include wired or wireless communication network connections, such as an IoT over 5G/6G or Wi-Fi 6.

The computer 106 typically includes one or more processor(s) 122, a memory 108, a power supply 124, an input/output (I/O) subsystem 126, and a communication bus 128 for interconnecting these components. The processor(s) 122 execute modules, programs and/or instructions stored in the memory 108 and thereby perform processing operations, including the methods described herein.

In some implementations, the memory 108 stores one or more programs (e.g., sets of instructions), and/or data structures, collectively referred to as "modules" herein. In some implementations, the memory 108, or the non-transitory computer readable storage medium of the memory 108, stores the following programs, modules, and data structures, or a subset or superset thereof:
- an operating system 110;
- an input processing module 112 that accepts signals or input datasets from the industrial assets 102 via the communication link 132. In some implementations, the input processing module accepts raw inputs from the industrial assets 102 and prepares the data for processing by other modules in the memory 108;
- a principal component (PC) module 114;
- a weighted PC module 116;
- a ranking module 118; and
- an output module 120 that outputs information related to ranked and/or selected nodes to other components of the system 100 (e.g., an attack neutralization module that neutralizes threats or attacks to the industrial assets 102).

Details of operations of the above modules are described below in reference to FIGS. 2A-10, according to some implementations.

The above identified modules (e.g., data structures, and/or programs including sets of instructions) need not be implemented as separate software programs, procedures, or modules, and thus various subsets of these modules may be combined or otherwise re-arranged in various implementations. In some implementations, the memory 108 stores a subset of the modules identified above. In some implementations, a database 130 (e.g., a local database and/or a remote database) stores one or more modules identified above and data associated with the modules. Furthermore, the memory 108 may store additional modules not described above. In some implementations, the modules stored in the memory 108, or a non-transitory computer readable storage medium of the memory 108, provide instructions for implementing respective operations in the methods described below. In some implementations, some or all of these modules may be implemented with specialized hardware circuits that subsume part or all of the module functionality. One or more of the above identified elements may be executed by the one or more of processor(s) 122.

The I/O subsystem 126 communicatively couples the computer 106 to any device(s), such as servers (e.g., servers that generate reports), and user devices (e.g., mobile devices that generate alerts), via a local and/or wide area communications network (e.g., the Internet) via a wired and/or wireless connection. Each user device may request access to content (e.g., a webpage hosted by the servers, a report, or an alert), via an application, such as a browser. In some implementations, output of the computer 106 (e.g., output generated by the output module 120) is communicated to other servers (e.g., for automatic neutralization of cyber-attacks) for further processing. Some implementations include attack neutralization modules in the computer 106, to further process output to neutralize threats to the industrial assets 102.

The communication bus 128 optionally includes circuitry (sometimes called a chipset) that interconnects and controls communications between system components.

Described herein are techniques for implementing a node selection architecture and functionality of a cyber-attack detection and localization system as applied to cyber-physical and industrial control systems. Various aspects of the techniques described herein may be implemented using the modules described above in reference to FIG. 1, according to some implementations. The techniques described herein use data-driven methods and field data, e.g., without relying on digital twins, computer models of assets, or operational domain expertise. The attack detection and localization methods and systems use multivariate time series data collected from a plurality of monitoring nodes. For example, the input processing module 112 collects multivariate time series data from the plurality of nodes 104. The monitoring nodes may include signals from critical sensors, controller nodes, actuators, and/or key software nodes to be used to monitor occurrences of cyber-threats or abnormal events. Selection of a monitoring node is a cumbersome task, traditionally done via trial and error using domain knowledge. The techniques described herein provide data-driven methods to select monitoring nodes completely automatically or semi-automatically in conjunction with domain knowledge.

To provide background and notation for the description below, suppose $(x_1, x_2, \ldots, x_p) \in \mathbb{R}^p$ is a set of original variables (features or nodes). Consider g (>1) groups of multivariate time series (MTS) data items $X_t \in \mathbb{R}^{n_i \times p}$, $t=1, \ldots, g$, where $n_i$ is the number of observations (measurements) for each group. Suppose further that each group is represented by its first k PCs, with each PC axis being denoted by $z_i^{(t)} \in \mathbb{R}^p$, with $i=1, \ldots, k$, $t=1, \ldots, g$, $1 \leq k \leq p$. Define for each group of data the matrix $L_t :=$ $j\{\ell_{ij}^{(t)}\} \in \mathbb{R}^{k \times p}$, with $\ell_{ij}^{(t)}$ being the loading of the jth variable $x_j$ (j=1, \ldots, p) on the ith PC of the tth group; that is:

$$L^t = \begin{bmatrix} (z_1^{(t)})^\top \\ (z_2^{(t)})^\top \\ \vdots \\ (z_k^{(t)})^\top \end{bmatrix} \in \mathbb{R}^{k \times p}, z_1^{(t)} = \begin{bmatrix} \ell_{i1}^{(t)} \\ \ell_{i2}^{(t)} \\ \vdots \\ \ell_{ip}^{(t)} \end{bmatrix} \in \mathbb{R}^p. \quad (1)$$

The PCs are assumed to be orthonormal:

$$(z_i^{(t)})^\top z_j^{(t)} = \begin{cases} 0, & i \neq j \\ 1, & i = j \end{cases}, \forall t.$$

This implies that $L_t L_t^T = I_k$. Each set of axes described by $L_t$ describes a k-dimensional subspace of the original p-dimensional space. The following theorem will be used:

Theorem 1. Let $Q \in \mathbb{R}^{n \times n}$ be a symmetric matrix. Define $y_1, \ldots, y_n$ recursively so that $y_k+1$ maximizes the quadratic form $y^T Q y$ over $S_k := S \cap M_{k\perp}$ where S is the unit sphere in $\mathbb{R}^n$ and $M_k$ denotes the span of $y_1, \ldots, y_k$, with $M_0 = \{\emptyset\}$. Then each $y_k$, k=1, \ldots, n, is an eigenvector of Q and its corresponding eigenvalue satisfies $\lambda_k = y_k^T Q y_k$. Notice that by construction $S_{k+1} \subset S_k$ and $\lambda_1 \geq \lambda_2 \geq \ldots \geq \lambda_n$.

In other words, $$\max_{\|y\|=1} y^\top Q y$$

is given by the largest eigenvalue $\lambda_1$ of Q that is attained when y is the eigen-vector, $y_1$, corresponding to $\lambda_1$. The second largest value of the quadratic form above when y is imposed to be orthogonal to $y_1$ is $\lambda_2$, the second largest eigenvalue of Q, and is attained when y is the eigenvector $y_2$ associated with $\lambda_2$ and so forth.

Some implementations incorporate variances along the Principal Components (PCs) of multivariate time series (MTS) data items for feature selection and ranking. Some implementations find a common "average" subspace of all subspaces generated by different data groups. The following lemma is used:

Lemma 1. Let $b \in \mathbb{R}^p$ be an arbitrary unit vector in the original p-dimensional space and let $\delta_t$ be the angle between b and the vector most nearly parallel to it in the subspace generated by the k PCs of group t. Then the value of b that maximizes $V := \sum_{t=1}^g \cos^2 \delta_t$ is given by the eigenvector $b_1$ corresponding to the largest eigenvalue $\mu_1$ of $$H := \sum_{t=1}^g L_t^T L_t \quad (2)$$

Moreover, a subspace of dimension k that resembles all g subspaces as closely as possible is generated by the set of orthonormal axes $\{b_1, b_2, \ldots, b_k\}$, where $b_2$ is the eigenvector of H corresponding to the second largest eigenvalue $\mu_2$ of H with respect to which the criterion V has the next largest value. Similarly, $b_3, \ldots, b_k$ correspond to the remaining eigenvalues of H in descending order.

Proof. The projection of $b \in \mathbb{R}^p$ onto the subspace generated by the rows of $L_t$ and expressed with respect to these k axes is given by $L_t b \in \mathbb{R}^k$. The coordinates of the same projection with respect to the original p orthogonal axes are the components of $L_t^\top(L_tL_t^\top)^{-1}L_tb = L_t^\top L_tb$ since $L_tL_t^\top = I_k$. Regarding angle $\delta_t$, $$b^\top(L_t^\top L_tb) = \|b\|\|L_t^\top L_tb\|\cos\delta_t$$

$$= \sqrt{b^\top L_t^\top L_tL_t^\top}\, L_tb\cos\delta_t$$

$$= \sqrt{b^\top L_t^\top L_t}\, b\cos\delta_t$$

$$\Rightarrow \cos^2\delta_t = b^\top L_t^\top L_tb,$$

where $\|b\|=1$, $L_tL_t^T=I_k$. The remaining part of the lemma follows from Theorem 1.

The above lemma is used for the case where each $L_t$ corresponds to a MTS item. Specifically, eigen-decomposition is performed on H in (2), and a set of "average" k principal components described by a matrix $L \in \mathbb{R}^{k \times p}$ was found. Subsequently, ranking of each variable is performed on the basis of its contribution to the common PCs $\tilde{L}$. Specifically, define $r_i := \mathrm{col}_i(\tilde{L}) \in \mathbb{R}^k$ to be the loadings of variable $i, i=1, \ldots, p$, on the k common PCs. Then the score $\tilde{S}_L$ of each variable is computed as $$S_i = \|r_i\| = \|\mathrm{col}_i(\tilde{L})\| \tag{3}$$

Note that the above methodology considers the contributions among PCs of different MTS datasets to be equivalent. Specifically, this happens not only in the determination of common ("average") principal axes via (2), but also at the level of ranking through (3). In general, however, one might prefer to place more emphasis on those MTS items which have more variability, and potentially, are more representative.

The following description extends the methods described above and proposes a weighted version of common axes determination and variable ranking. The methods described above applies PCA on correlation matrix while the techniques described here and below apply PCA on covariance matrix of normalized variables. However, correlation on each separate run does not consider the respective variance (spread) of different runs since data are standardized with respect to variance of each mts to variance information from PCA is only with respect to a particular monitoring nodes and monitoring nodes with low variance (spread) cannot be distinguished. For example, some runs may happen to have low variance, i.e., they quickly get to steady state. Furthermore, some nodes appear to be close to constant for some runs which makes the computation of the correlation matrix numerically hard. The techniques described herein are suitable for using breaking points.

Some implementations use variances of the PCs of each MTS dataset as weights. Some implementations define a similarity metric between different MTS groups, and a weighted norm may be used. In some implementations, a heuristic may be used that averaged out the weights of all MTS data for each variable in order to implement the proposed norm. Some implementations use such techniques for weighted common axes determination and variable ranking.

In some implementation, the kernel PCA technique may be used. The kernel PCA technique involves computing principal components in (possibly, infinite-dimensional) feature spaces by means of nonlinear kernel functions in the input space. The (weighted) common principal component axes may be computed through solving a finite-dimensional optimization problem, formulated with respect to the Gram matrix of the data set. Kernel PCA may be used to address possible nonlinearies in the observed dataset.

Example PCA-Based Selection and Ranking

Example Common Axes Determination

Some Implementations Perform Eigen-Decomposition on the Matrix $$H_w := \Sigma_{t=1}^g L_t^T W_t L_t \succeq 0 \tag{4}$$

Some implementation use equation (4) to determine a set of common axes according to the variance of each PC of the different subspaces described by $L_t$, $t=1, \ldots, g$. Here, $$W_t := \mathrm{diag}([w_1^{(t)}, \ldots, w_k^{(t)}]) \in \mathbb{R}^{k \times k} \tag{5}$$

$W_t$ is the weighting matrix where $w_i^{(t)} \geq 0$ is proportional to the variance, $\sigma_i^{(t)} \geq 0$, of the ith PC belonging to the tth group. For example, $w_i^{(t)} = \sigma_i^{(t)}$ or $w_i^{(t)} = \sigma_i^{(t)}/\Sigma_{i,t}\sigma_i^{(t)}$ (although scaling of the variances may not be needed since $\sigma_i^{(t)} \geq 0$ already). This structure of $W_t$ and $H_w$ promotes closeness of the "common" subspace to those PCs with high variability among all data sets, regardless of their ordering within their corresponding MTS. For instance, if the second PC of MTS i expresses more variability than the first PC of MTS j, higher priority will be given to the former axis for forming the common subspace of principal components. This is desired, since certain runs of the data set might be less informative than others. Computing a strictly "average" common subspace cannot make this distinction and treats each MTS equivalently.

Below two Lemmas are described. The two lemmas associate $H_w$ in (4) with particular metrics of weighted contributions. Both metrics result in eigen-decomposition of the same matrix $H_w$ and are thus equivalent.

Lemma 2. Let $b \in \mathbb{R}^p$ be an arbitrary unit vector in the original p-dimensional space and let $\emptyset_i^{(t)}$ be the angle between b and the ith PC of the tth MTS dataset $z_i^{(t)}$. Consider the weighted metric $$V_{w1} := \Sigma_{t=1}^g \Sigma_{i=1}^k w_i^{(t)} \cos^2 \emptyset_i^{(t)}, \tag{6}$$

where $w_i^{(t)}$ are the weights used to define $W_t$ in (5). Then $\max_{\|b\|=1} V_{w1}$ is equal to the largest eigenvalue $\lambda_1$ of $H_w$ defined in (4) and is attained when b becomes the eigenvector $b_1$ of $H_w$ corresponding to $\lambda_1$. Moreover, define a k-dimensional subspace $b_1, b_2, \ldots, b_k$, where each axis maximizes the metric $V_{w1}$ and remains orthogonal to the remaining set of axes, by performing eigen-decomposition of $H_w$.

Proof From the definition of the dot product and the angle $\emptyset_i^{(t)}$:

$$b^T z_i^{(t)} = \|b\|\,\|z_i^{(t)}\| \cos \emptyset_i^{(t)} \Rightarrow \cos^2 \emptyset_i^{(t)} = b^T z_i^{(t)}(z_i^{(t)})^T b,$$

where b, $z_i^{(t)}$ are known to be unit vectors. Hence $$V_{w1} = \sum_{t=1}^g \sum_{i=1}^k w_i^{(t)} b^\top z_i^{(t)} \left(z_i^{(t)}\right)^\top b$$

$$= b^\top \left(\sum_{t=1}^g \left(\sum_{i=1}^k w_i^{(t)} b^\top z_i^{(t)} \left(z_i^{(t)}\right)^\top\right)\right) b$$

$$= b^\top H_w b$$

where the last equality above is due to the structure of each matrix $L_t$, $W_t$, $t=1, \ldots, g$, see equations (1), (5). The remaining part of the lemma follows from Theorem 1.

Lemma 3. Let $b \in \mathbb{R}^p$ be an arbitrary unit vector in the original p-dimensional space and let $d_t \in \mathbb{R}^k$ be the most nearly parallel vector to it in the subspace described by the PCs of the tth MTS data and expressed in the same coordinates. Next denote by $\|\cdot\|W_t$ the weighted norm in each subspace described by $L_t$ such that $\|y\|W_t = (y^T W_t y)^{1/2}$, where the weighting matrix $W_t$ is given in (5). Define now the metric $$V_{w2} := \sum_{t=1}^{g} \|d_t\|_{W_t}^2. \tag{7}$$

Then $\max_{\|b\|=1} V_{w2}$ is equal to the largest eigenvalue $\lambda_1$ of $H_w$ defined in (4) and is attained when b becomes the eigenvector $b_1$ of $H_w$ corresponding to $\lambda_1$. Define a k-dimensional subspace $b_1, b_2, \ldots, b_k$, where each axis maximizes the metric $V_{w2}$ and remains orthogonal to the remaining set of axes, by performing eigen-decomposition of $H_w$.

Proof From the definitions of $d_t$ and the weighted norm $\|\cdot\|W_t$:

$$V_{w2} := \sum_{t=1}^{g} d_t^T W_t d_t = \sum_{t=1}^{g} (L_t b)^T W_t (L_t b) = b^T H_w b,$$

where the last equality above follows from the definition of $H_w$ in (4). The remaining part of the lemma follows from Theorem 1.

The metrics defined above have intuitive implications and, as stated before, result in eigenvalue decompositions of the same matrix $H_w$. In particular, maximization of $V_{w1}$ will give a subspace whose orthogonal axes are closer to those PCs with higher variances, among all MTS sets.

Correspondingly, maximization of $V_{w2}$ will give a subspace whose orthogonal axes, when projected to each subspace described by $L_t$, attain high weighted norms according to the variance along each PC of all MTS sets.

Note: In order for $\|\cdot\|W_t$ to be a valid norm, $W_t$ has to be positive definite. Hence, all k representative PCs of all groups must have strictly positive variances.

Example Variance-Based Ranking

In what follows, let equation (8) shown below include the k common (weighted) PC axes determined as discussed in the previous subsection.

$$\tilde{L}_w := \begin{bmatrix} b_1^T \\ b_2^T \\ \vdots \\ b_k^T \end{bmatrix} \in \mathbb{R}^{k \times p} \tag{8}$$

Some implementations associate contributions of each variable with a norm of their corresponding columns (loadings) in $\tilde{L}_w$. Some implementations choose a weighted norm of the loadings, promoting variables with high contributions on axes along which measurements have high variability.

Notice that the variances along the weighted common axes in $\tilde{L}_w$ are not given, but rather the variances of the PCs for each MTS are provided. Nonetheless, $V_{w1}$ (or $V_{w2}$) quantifies how close each common PC is to principal axes among all MTS data sets, depending on the variability of the latter. Moreover, since $\tilde{L}_w$ is obtained through eigendecomposition of $H_w$, the value of $V_{w1}$ for each eigenvector $b_1, \ldots, b_k$ is given by its corresponding eigenvalue $\lambda_1, \ldots, \lambda_k$.

Based on these observations, define $$\Lambda := \text{diag}([\bar{\lambda}_1, \ldots, \bar{\lambda}_k]) \in \mathbb{R}^{k \times k} \tag{9}$$

where each $\bar{\lambda}_1 \geq 0$ is proportional to eigenvalue $\lambda_i$. For example, $\bar{\lambda}_1 = \lambda_i$ or $\bar{\lambda}_1 = \lambda_i / \Sigma_j \lambda_j$ (although scaling of the eigenvalues may not be needed since $\bar{\lambda}_1 \geq 0$ already).

Denote also the norm $\|\cdot\|_\Lambda$ on $\mathbb{R}^k$ such that $$\|y\|_\Lambda := (y^T \Lambda y)^{1/2}, \forall y \in \mathbb{R}^k \tag{10}$$

$\Lambda$ has to be strictly positive definite for $\|\cdot\|_\Lambda$ to be a valid norm. Hence, if some common axis does not satisfy this condition, it shall be dropped.

Now, suppose $r_{w_i} := \text{col}_i(\tilde{L}_w) \in \mathbb{R}^k$ are the loadings of variable i, $i=1, \ldots, p$, on the k common weighted PCs. Then, some implementations rank the importance of each variable based on its score shown below as equation (11):

$$S_{w_i} := \|r_{w_i}\|_\Lambda = \|\text{col}_i(\tilde{L}_w)\|_\Lambda. \tag{11}$$

In contrast to considering contributions to each common axis equivalently, equation (11) promote features which have large loadings on PCs with high variability.

Example Results

First a simple comparison between different techniques is described herein. Only two MTS data sets are used to compute the common axes. For each technique, the quantity $R_t := \Sigma_{i,j} \cos^2 \varnothing_{ij}^{(t)}$ is shown in the table below, where $\varnothing_{ij}^{(t)}$ is the angle between the ith common axis and the jth PC of the tth group. The larger $R_t$ is, the closer the common subspace is to the particular MTS. The total variance, $V_{ar_t}$, of each MTS is also shown.

Two different cases are shown in the table below, where in one case the two runs are significantly different with respect to their respective variances, while in the second case this difference in variances is reduced.

|  | $V_{ar1} = 0.32$ | $V_{ar2} = 0.03$ | $V_{ar1} = 0.32$ | $V_{ar2} = 0.00$ |
|---|---|---|---|---|
| Average | $R_1 = 4.87$ | $R_2 = 4.87$ | $R_1 = 5.14$ | $R_2 = 5.14$ |
| Weighted | $R_1 = 5.65$ | $R_2 = 3.09$ | $R_1 = 7.00$ | $R_2 = 2.65$ |

It is apparent that the "average" subspace keeps the same distance between each MTS (and also each PC axis of each MTS) regardless of the respective variances. In contrast, the "weighted" subspace adjusts the angle deviations with respect to the variance of each axis.

Figure 2A:
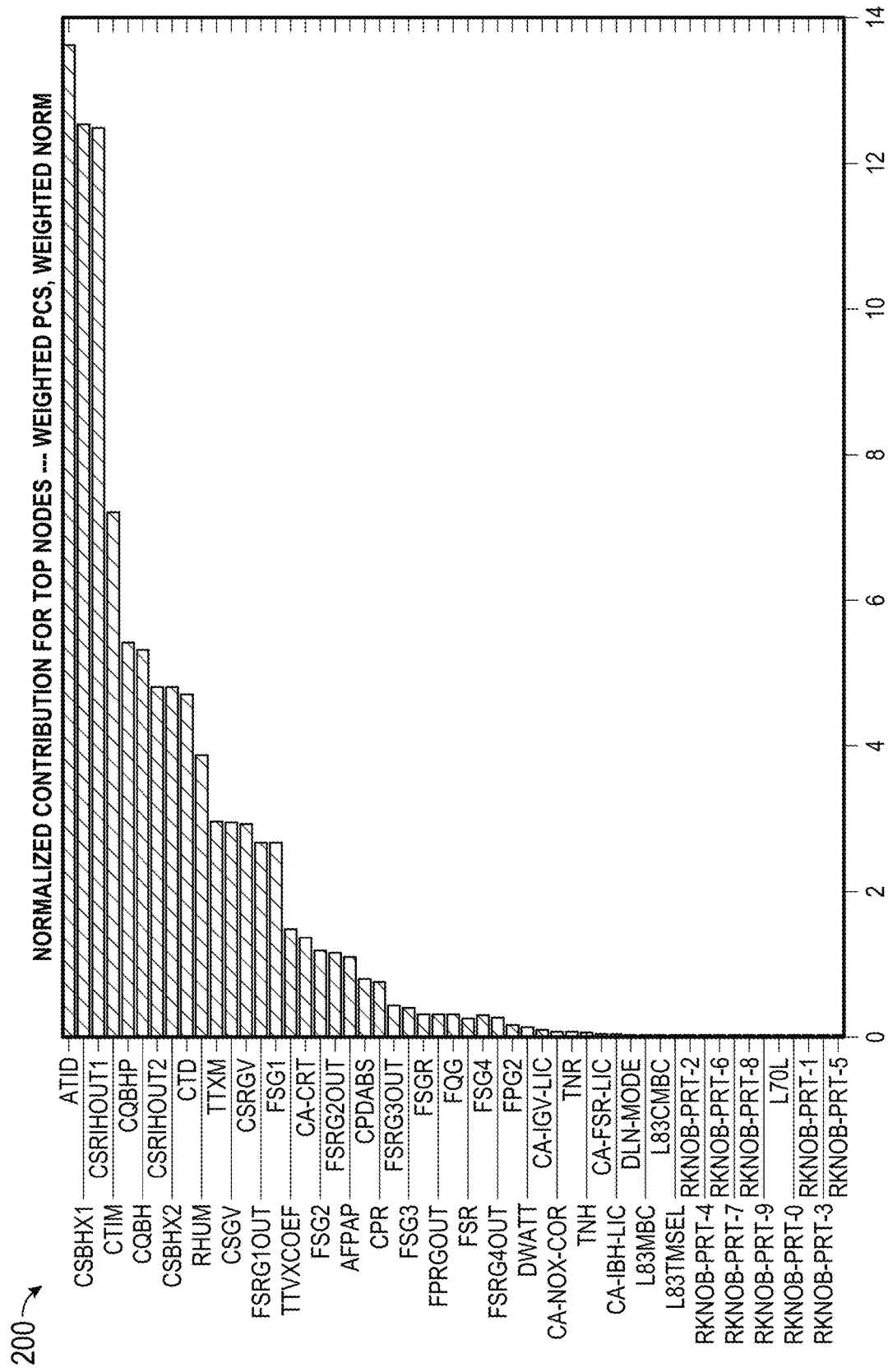
FIG. 2A shows an example graph plot that shows ranking of nodes with weighted common PCs, with preprocessing, but without clustering, according to some implementations.

FIG. 2A shows an example graph plot 200 that shows ranking of nodes with weighted common PCs, with preprocessing but without clustering (i.e., removing redundant nodes that convey similar information), according to some implementations. In FIG. 2A, and in graph plots show rankings in this disclosure, the y-axis shows different nodes and the x-axis shows normalized contribution for top nodes, with weighted PCs and weighted norm. The ranked nodes shown in FIG. 2A are for normal run data. Overall, results based on domain knowledge are very comparable to the technique based on average common PCs, when a large number of nodes is considered (18/22 nodes in the first 27 nodes, without clustering). However, when only a few top nodes are selected, the former technique does significantly better (12/22 versus 6/22 in the top 13 nodes, without clustering).

Clustering seems to cluster together nodes which are anticipated to have similar behaviors—FSRG2out with FSG2, FSRG1out with FSG1, FSRG3out with FSG3, FSRG4out with FSG4, crishout1 with csbhx1.

In general, clustering results differ when the number of clusters changes. For a small number of clusters, many nodes will usually belong to the same cluster and only one will be picked. The opposite happens when many clusters are considered. The former approach may rule out nodes which are not really redundant. The latter approach may keep redundant nodes in the list.

As an alternative, some implementations set a threshold for the distances within each cluster and start clustering with a small number of clusters. If the condition is not satisfied, increase the number of clusters and repeat. In this case, though, the distance threshold becomes the hyperparameter which requires tuning.

Figure 2B:
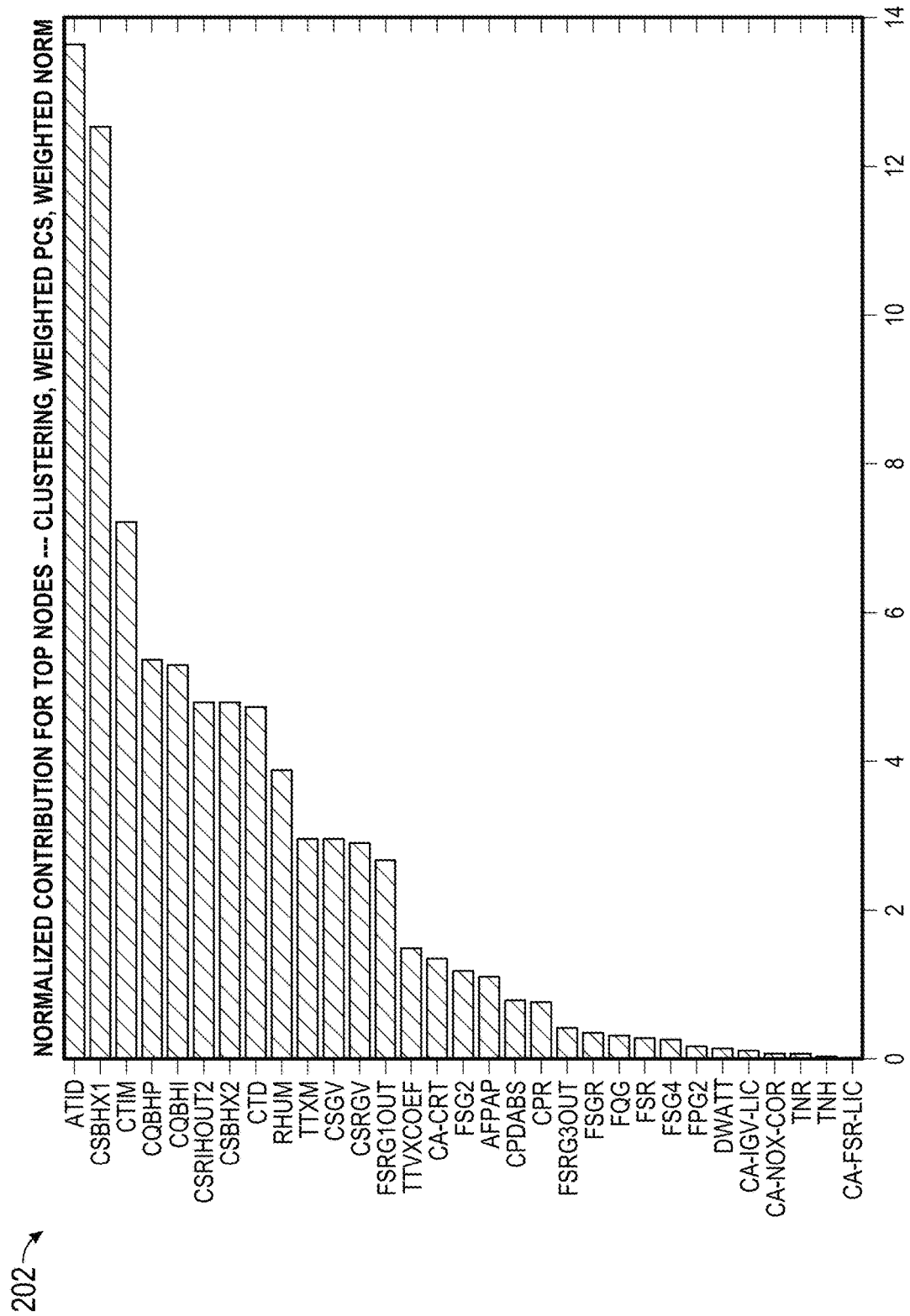
FIG. 2B shows another example graph plot that shows ranking of nodes with weighted common PCs, with preprocessing, and with clustering, according to some implementations.
Figure 2C:
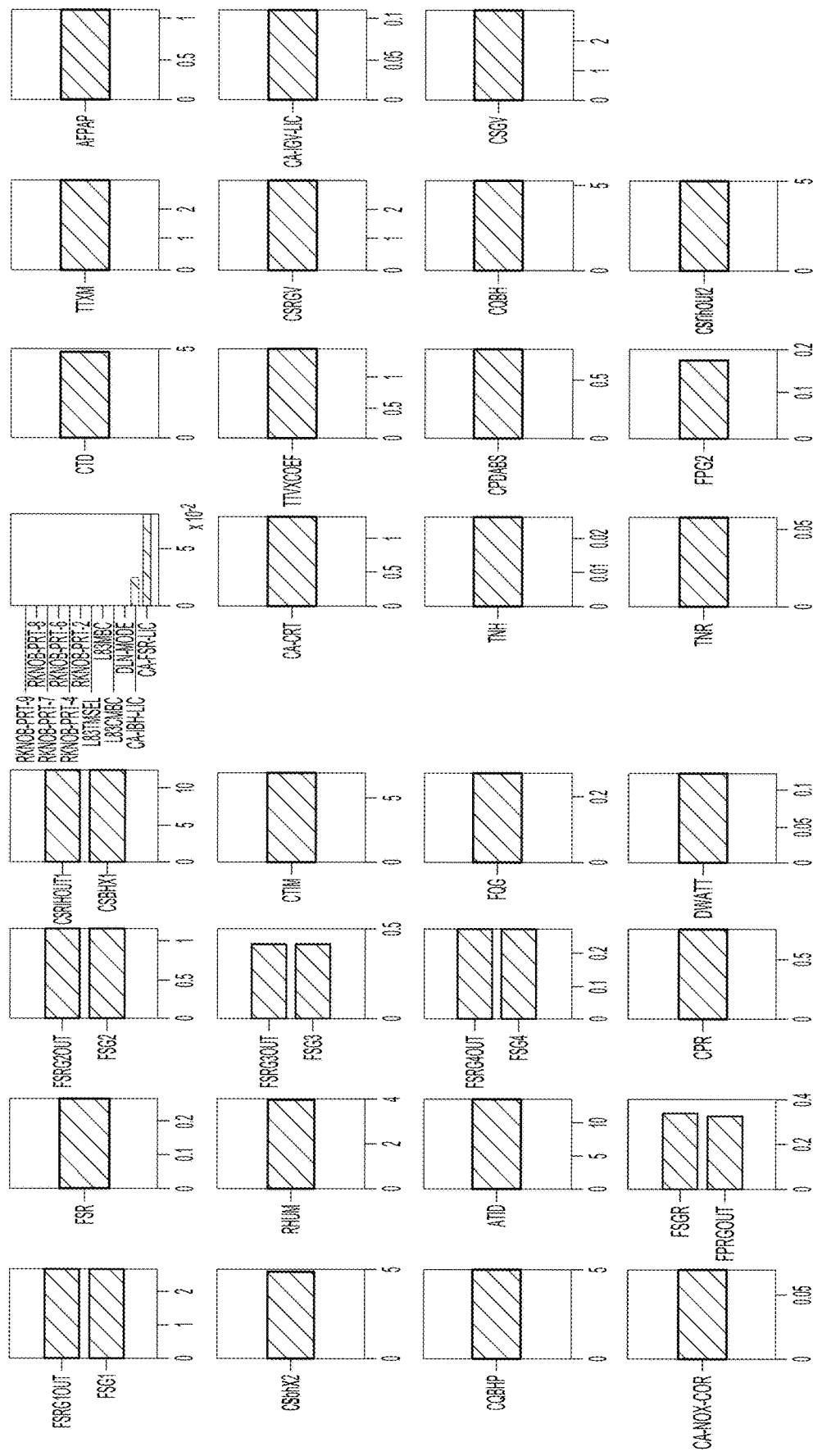
FIG. 2C shows example graph plots used for ranking top nodes for each cluster, according to some implementations.
Figure 3A:
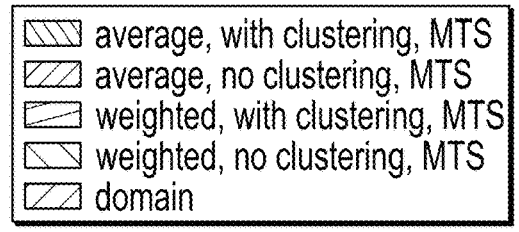
FIGS. 3A-3D show example bar graphs illustrating testing and training classification errors of attack vs normal runs in relation to a first number of selected nodes, according to some implementations.
Figure 3A:
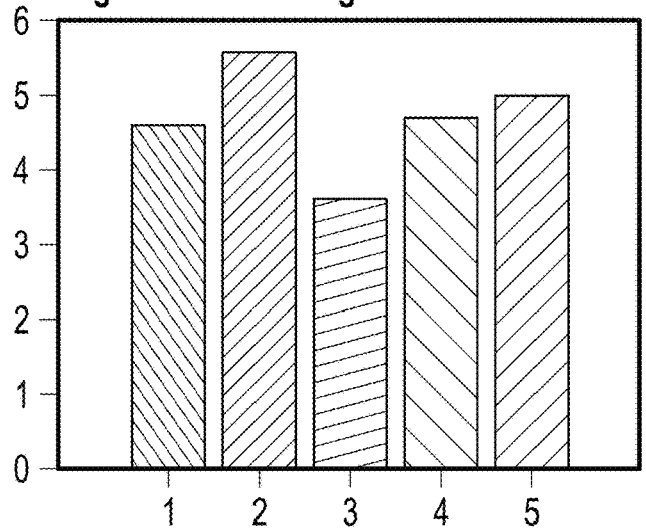
Figure 3B:
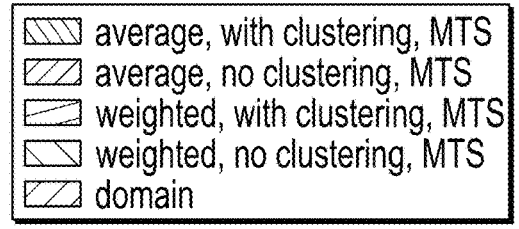
Figure 3B:
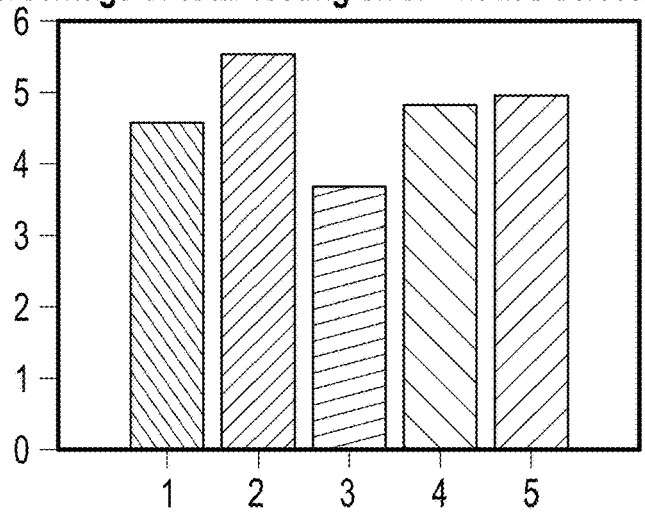
Figure 3C:
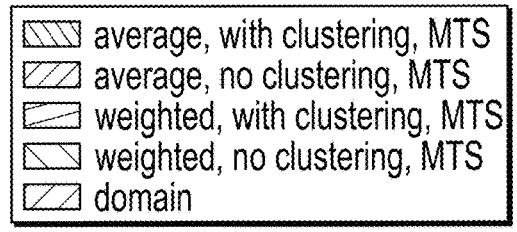
Figure 3C:
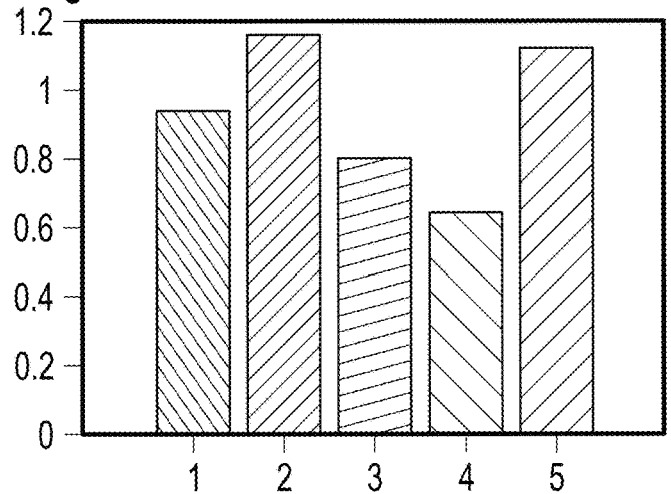
Figure 3D:
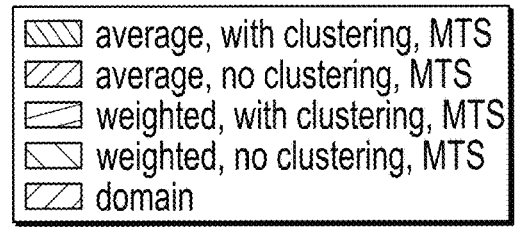
Figure 3D:
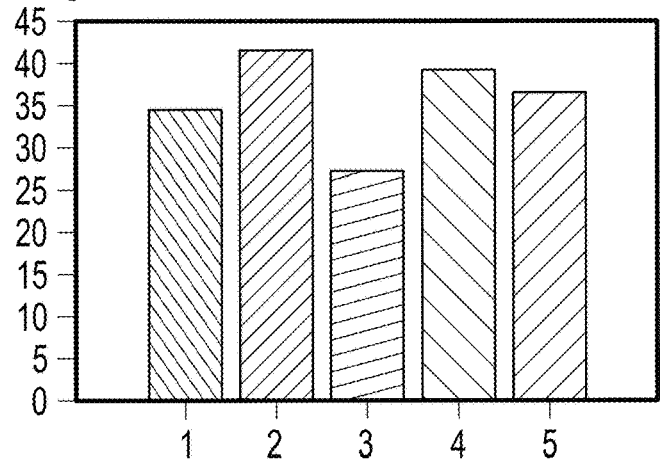
Figure 4A:
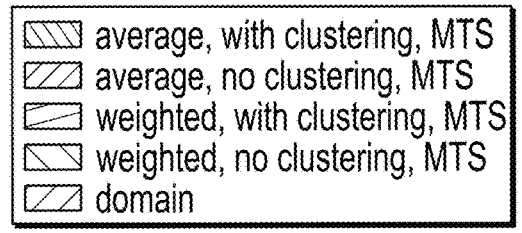
FIGS. 4A-4D show example bar graphs illustrating testing and training classification errors of attack vs normal runs in relation to a second number of selected nodes, according to some implementations.
Figure 4A:
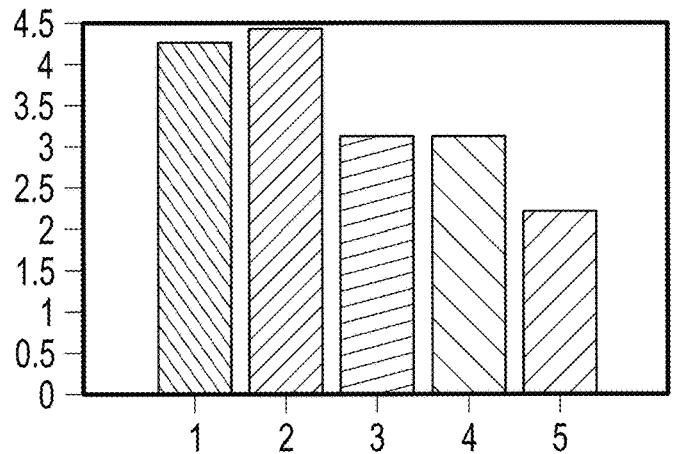
Figure 4B:
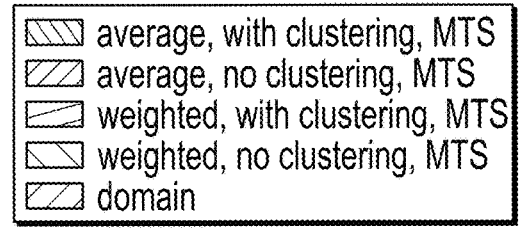
Figure 4B:
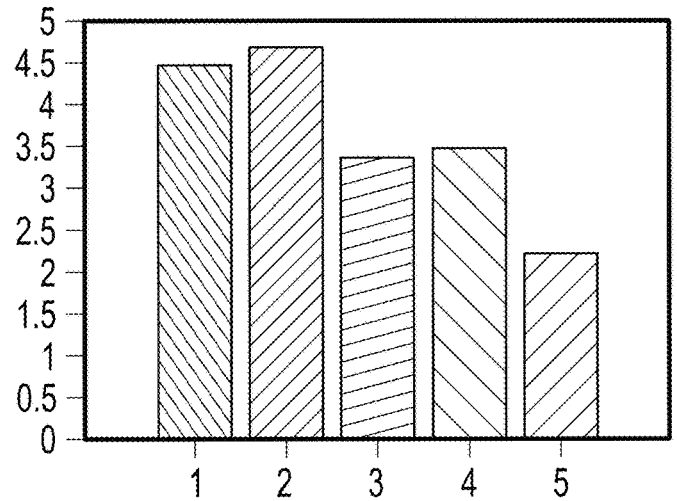
Figure 4C:
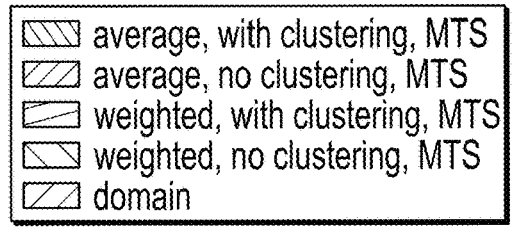
Figure 4C:
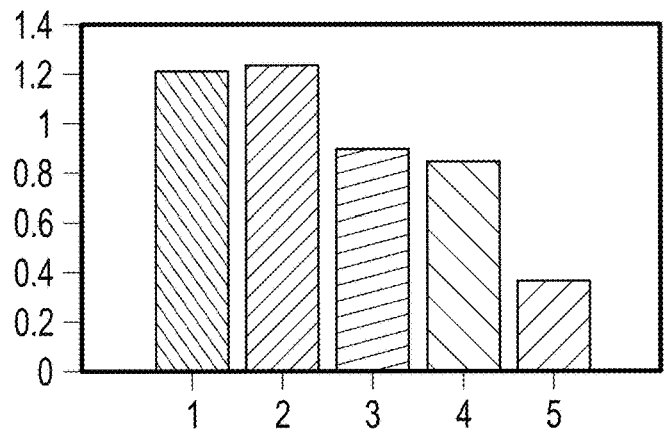
Figure 4D:
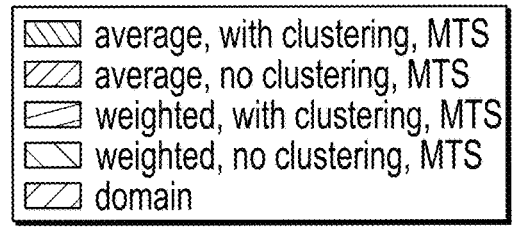
Figure 4D:
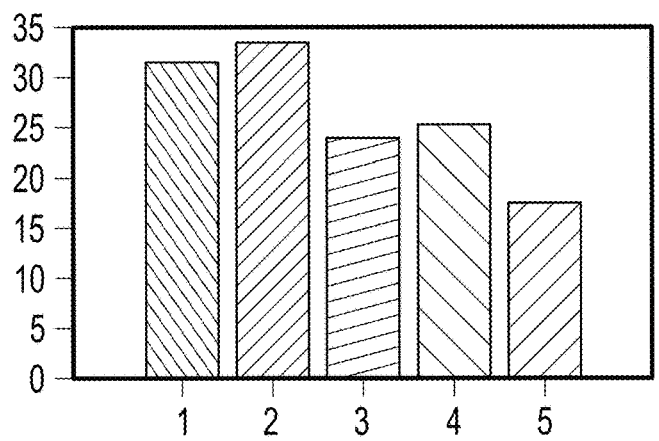
Figure 5A:
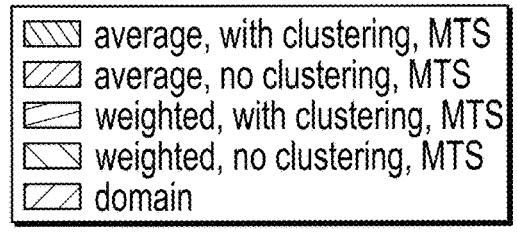
FIGS. 5A-5D show example bar graphs illustrating testing and training classification errors of attack vs normal runs in relation to a third number of selected nodes, according to some implementations.
Figure 5A:
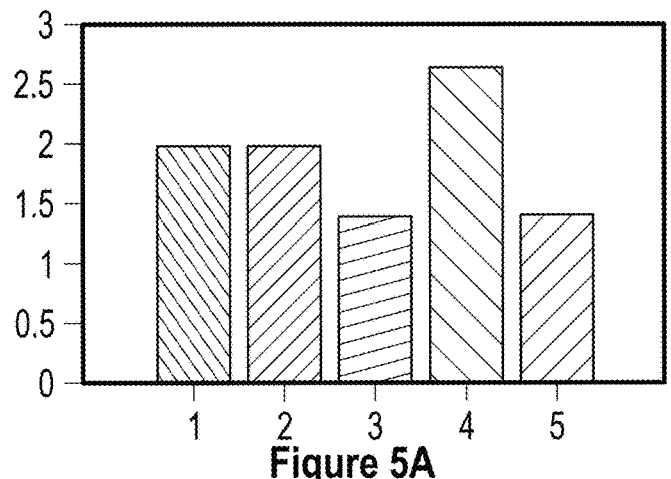
Figure 5B:
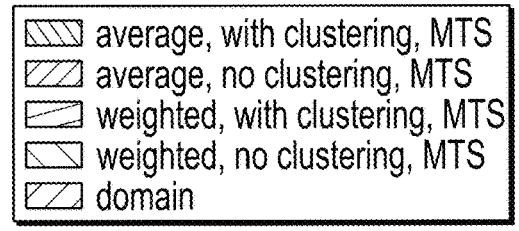
Figure 5B:
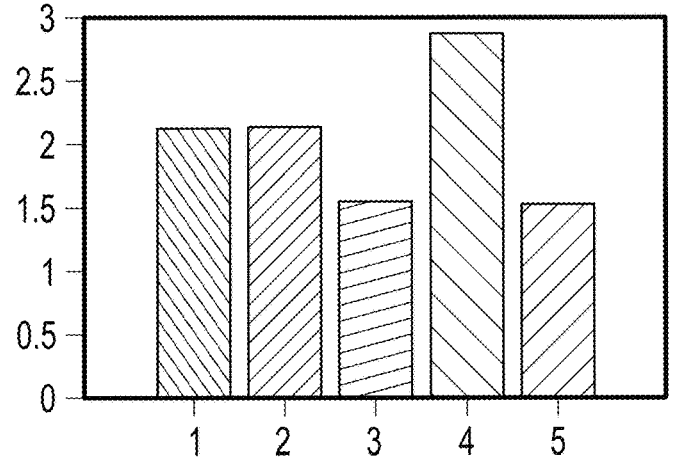
Figure 5C:
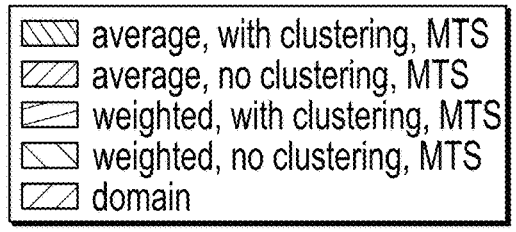
Figure 5C:
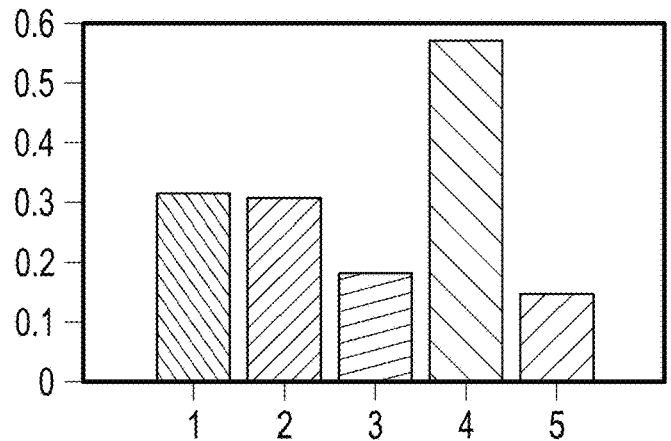
Figure 5D:
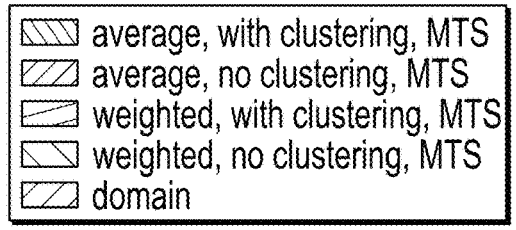
Figure 5D:
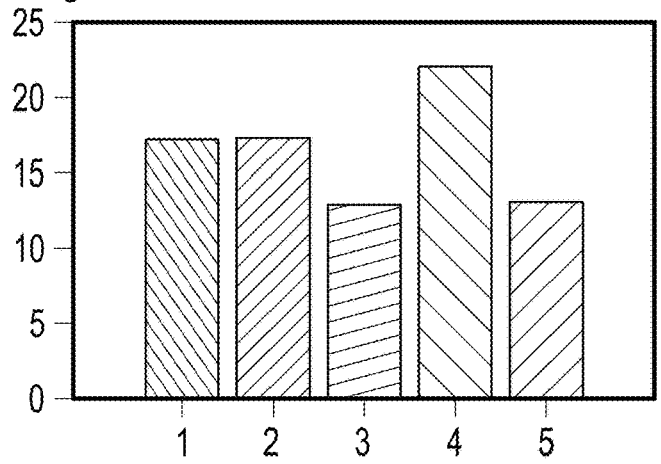

FIG. 2B shows another example graph plot 202 that shows ranking of nodes with weighted common PCs, with preprocessing, and with clustering, according to some implementations. Similar to FIG. 2A, in FIG. 2B, the y-axis shows the different nodes and the x-axis shows normalized contribution for top nodes, with clustering, weighted PCs, and weighted norm. FIG. 2C shows example graph plots 206 used for ranking top nodes for each cluster, according to some implementations. In this example, ranking within 31 clusters (each box or sub-plot is for a respective cluster) and shows normalized contributions for nodes within each cluster, with clustering, weighted PCs and weighted norm.

FIGS. 3A-3D, 4A-4D, and 5A-5D show example bar graphs for testing and training classification errors of attack vs normal runs in relation to different numbers (10, 13, and 22) of selected nodes after node ranking, according to some implementations. Each bar graph relates to a particular method of node selection. For example, bars related to the legend "average" show results based on PCA-based node selection using the common PCA axes; bars related to the legend "weighted" show results based on the node selection techniques described in this instant disclosure; and bars related to the legend "domain" show results based on the set of nodes determined by domain experts.

For the bar graph in each of FIGS. 3A-3D, 4A-4D, and 5A-5D, the illustrated results correspond to data from a high efficiency air-cooled gas turbine (e.g., GE's 7 HA Gas Turbine). However, the implementation of the techniques disclosed herein are not limited to only gas turbines. The classifier used for these implementations is a standard linear support vector machine (SVM). The illustrated results have also been averaged out across different, randomly selected, cross validation sets. The figures with titles "Percentage of error on normal detection" and "Percentage of error on attack detection" only correspond to the test set (i.e., data that the rank selection methodology and the classifier have not seen during training). Based on these exemplary results, it is generally observed that the techniques described herein with respect to the claimed invention perform better than the conventional techniques, and match well against results based on domain experts-based techniques, and outperform them in certain cases.

Example Numerical Results for Attack Detection

An example comparison of different techniques is provided for illustration. As a base reference, a supervised classification setting for attack detection of a power plant component is used. The data used in the experiments were generated by a high-fidelity simulator. The performance of the nodes selected by domain experts is also shown.

Details about the classifications tests: domain experts gave three different sets of nodes, with each set being a superset of its previous. The number of nodes within those sets determined the number of nodes selected by the PCA-based methodologies. An 8-fold cross validation was performed with 30% holdout for testing (splitting was performed randomly each time). The same splitting of the dataset was used by all methods among all cross validation instantiations. For PCA-based ranking, the following were used: $\delta$=90%, 22 clusters for selecting 10 and 13 nodes and 31 clusters for the last example. The results shown in the figures were averaged among all 8 cross validation instances. A linear SVM classifier was used. Given the selected nodes, training data were created based on the statistics of windows of time series. The figures corresponding to normal/attach detection are associated with the test data sets.

Example PCA-Based Ranking After Preprocessing

Some implementations rank nodes based on their contributions on the principal components of the data set. Some implementations handle data in two different ways: perform PCA on full data set, and perform PCA on each different run to compute common PCs, using techniques described above. Before applying PCA, some implementations filter and normalize data.

Since PCA examines the variance along PCs, it will rank nodes with high variation higher. Some variables may have high variance, but their time-series data is not representative, overall. Specifically, some nodes may change values very frequently, while others may have a few abrupt changes in their time series (especially control nodes). Regarding the former, some implementations discard nodes with significant high frequencies in their time series via a fast fourier transform (FFT) method. For the latter, some implementations use breaking points to identify abrupt change in the behavior of the nodes and perform PCA on the time series windows defined within these breaking points. In this way, some implementations consider data variation only between abrupt transitions (change of modes). In some implementations, common axes do not consider variances of each PC.

Example Pipeline

In some implementations, for data extraction, raw data are loaded, normalized, filtered and/or smoothened, variables with time series that have significant contributions from high frequencies are discarded. The discarding is performed by taking the FFT of the raw time series and computing the total contributions of frequency components that were larger than some threshold. When this contribution was high enough, the variable was discarded.

In some implementations, for PCA-based ranking, one or more of the following techniques are used for finding the contributions (loadings): (i) all runs are concatenated into one data matrix and PCA is performed once on the entire data set; (ii) each run was treated separately and PCA is performed on time series data of each run, and a final PCA is applied on the common PCs.

Some implementations create windows of data that lie within breaking points. Breaking points are defined for each variable of the run when abrupt changes were identified. Then the time instances for the breaking points for the entire run are computed as a logical OR between the corresponding time instances of each variable. If the window size is large enough, PCA is performed. The common (average) axes are then found for all PCs of the used time series windows.

In some implementations, for each of the techniques described above, the contributions of the nodes are found in the following different ways: ranking based on the norm of each variable on the loadings (PCs); clustering of the variables based on their loadings to obtain ranking within each cluster based on the norm of the loadings. In this way, only one node is selected from each cluster and redundant nodes are discarded.

The following description provides more details on the techniques described above, according to some implementations. In some implementations, filtering is applied to smooth the data. Initially, a moving average is performed. However, some variables (usually control nodes) have spikes in their time series and moving average only reduces their magnitude. Some implementations use a rlowess filter to eliminate these spikes as outliers. When rlowess gives abrupt changes in some cases, some implementations use a moving average on top of the rlowess filter. FIGS. 6A and 6B show graph plots 600 and 602 for a variable L70L and a variable FSRG1OUT, respectively, according to some implementations. The lines in FIGS. 6A and 6B (in which the x-axis corresponds to time and the y-axis corresponds to measured values of the nodes) correspond to raw data, moving average, rlowess, and rlowess with moving average.

Figure 6C:
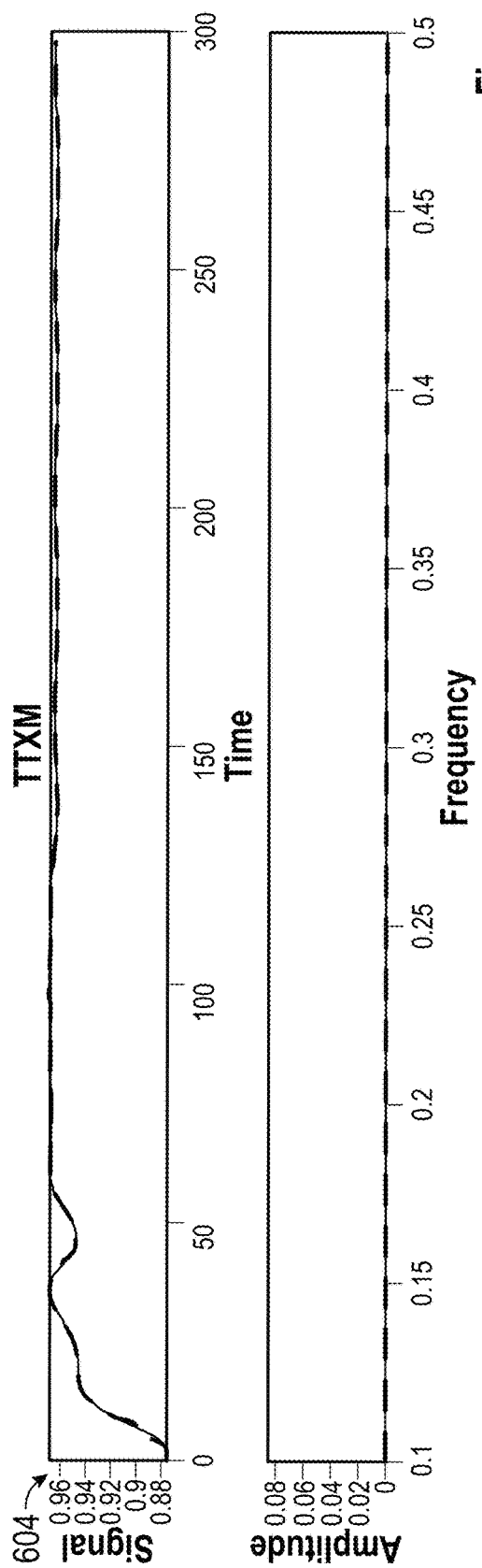
FIGS. 6C and 6D show graph plots that show effect of variable removal, according to some implementations.
Figure 6D:
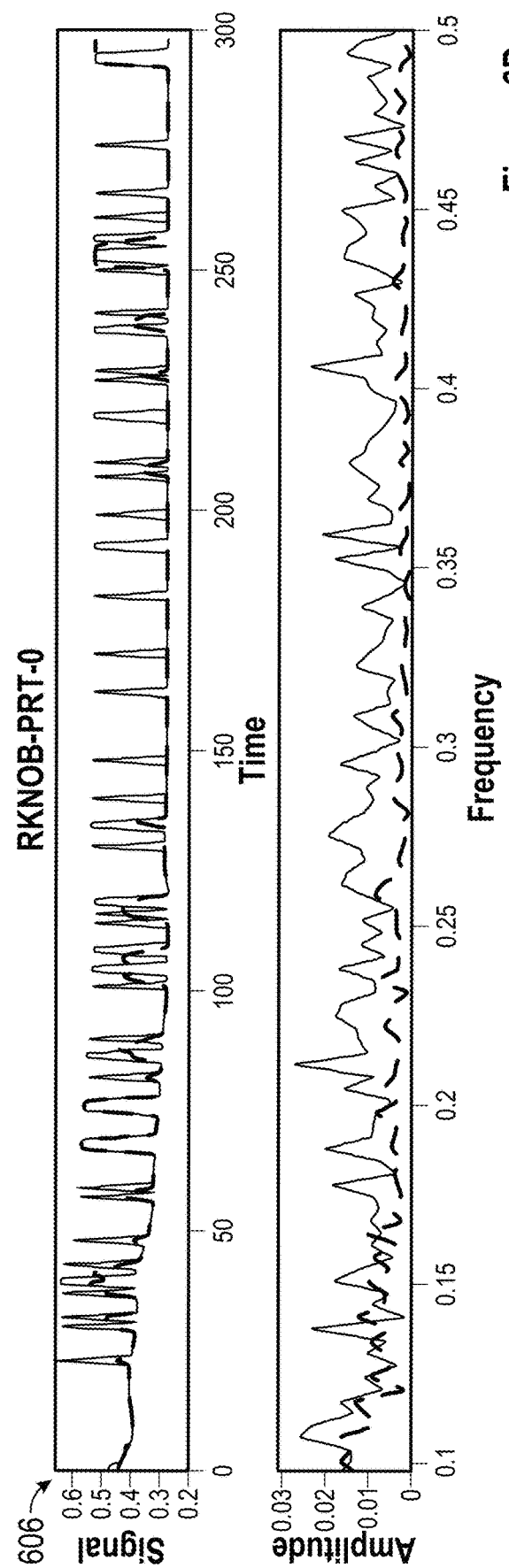

Variable removal removes variables with time series data having significant high frequency contributions. Some implementations apply FFT and compute the sum of all high frequency amplitudes (high frequencies are selected as those being over some threshold, like above 10% of the spectrum). If this total amplitude is determined to be above some prespecified threshold, the variable is discarded. FIGS. 6C and 6D show graph plots 604 and 606, for variables TTXM and TKNOB-PRT-0, respectively, according to some implementations. The graphs shown include graphs for signal versus time and amplitude versus frequency (each shown separately, for each node). As shown, the first node (TTXM) has significant amplitudes for high frequencies (dashed line corresponds to smoothed signal). The variables that were discarded using the techniques described above were: {'G5L70L'}, {'G5RKNOB_PRT_0'} {'G5RKNOB_PRT_1'}, {'G5RKNOB_PRT_3'}, {'G5RKNOB_PRT_5'}.

Figure 6E:
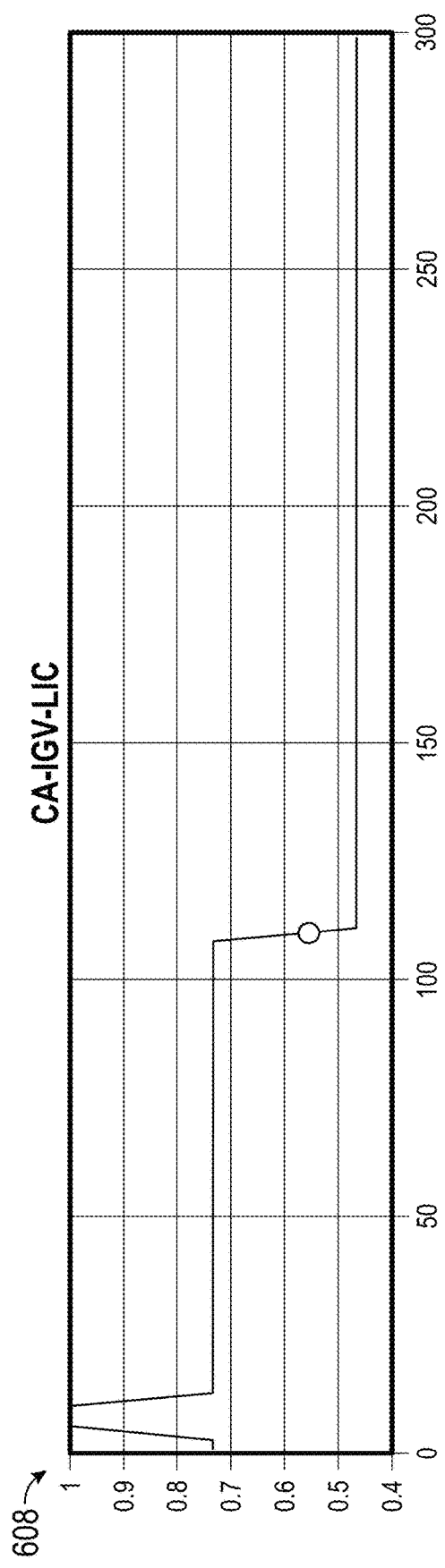
FIGS. 6E and 6F show graph plots that show breaking points, according to some implementations.
Figure 6F:
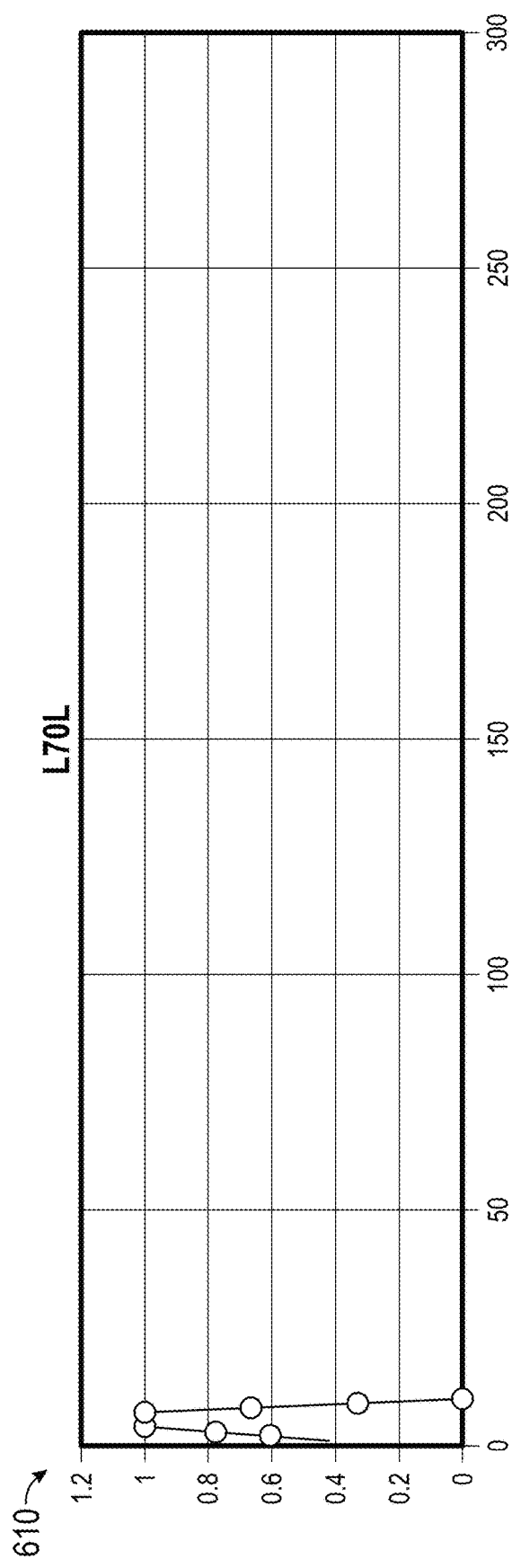

In some implementations, breaking points are defined as the points that have significantly different values that the previous point in the time series. This is combined with points with respect to which the portions of the time series have significantly different mean values. The combination of these two methods outperform each individual metric. Examples of breaking points are shown in FIGS. 6E and 6F, according to some implementations. FIGS. 6E and 6F show example graph plots 608 and 610 for a node C1-IGV-LIC and a node L70L, respectively, illustrating examples of how the addition of breaking points divide a full run into smaller runs (time series data). In some implementations, data windows are kept between breaking points for PCA, instead of considering the full runs.

For filtering, in some instances, some spikes have duration more than 1 second, hence an rloess filter will not eliminate them. If more points are used for the filter, these spikes will be eliminated but the shape of the smoothed time series may be significantly different, so some implementations use a few points for rloess and rely on breaking points.

For breaking points, in general, the threshold for denoting a point as a breaking point affects the position ranking of certain nodes (such as the node AFPAP in the example described above), although certain bad logical node may get low ranks for a wide range of threshold values. Having a lower threshold gives more breaking points which might be good for some bad nodes (like CA-IGV-LIC in the example above) but may also be bad for other representative nodes that have high variability.

Example Results

FIGS. 7A-7L show example graph plots that show rankings of nodes based on the techniques described above, according to some implementations. Comparison is made between with and without the preprocessing steps mentioned above. Regarding the contribution of each variable, suppose Li is loading of node i on the (common) PCs. Then the node i's contribution is computed and normalized as $100*Li/\Sigma Li$.

Figure 7A:
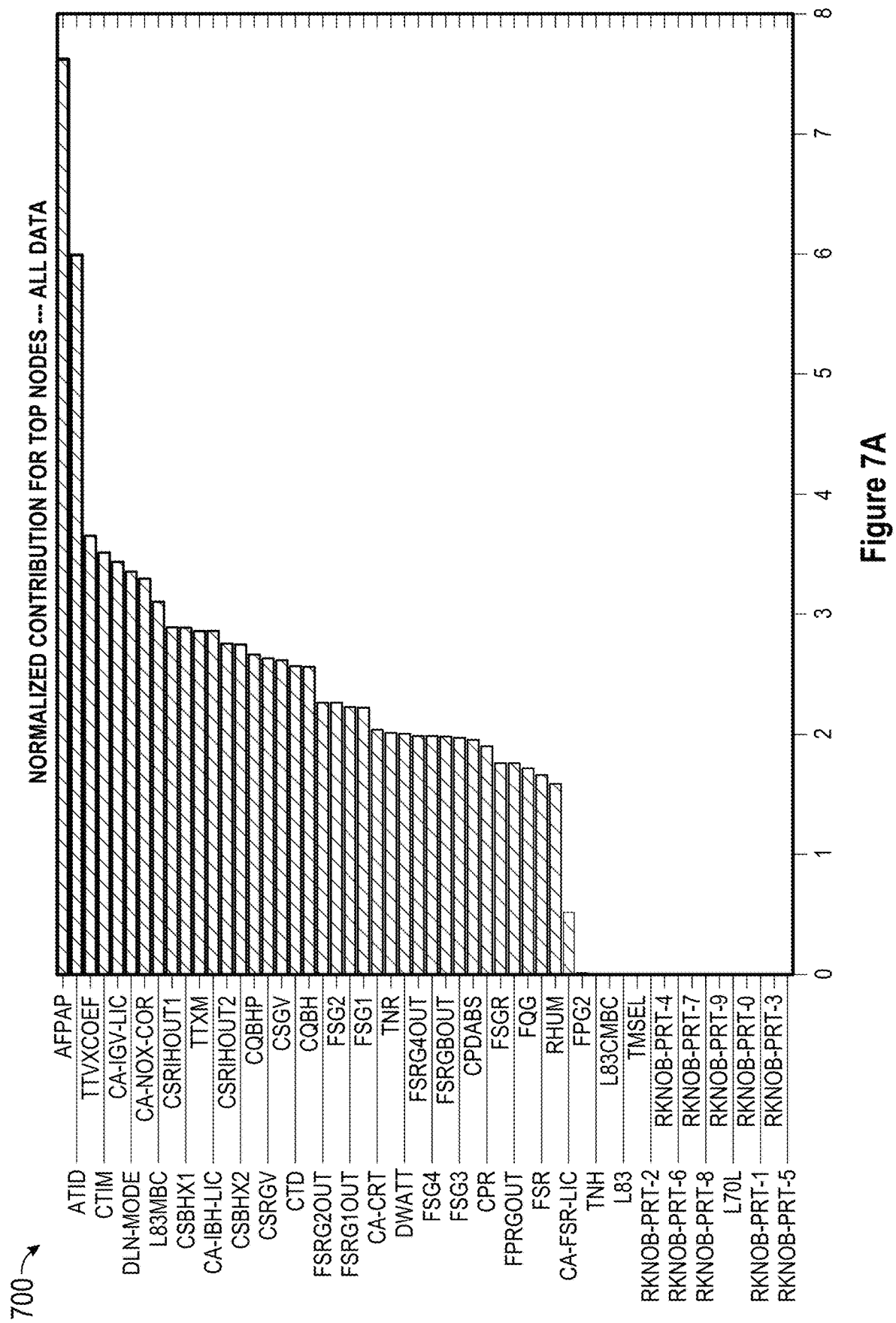
FIGS. 7A-7L show example graph plots that show rankings of nodes, according to some implementations.
Figure 7B:
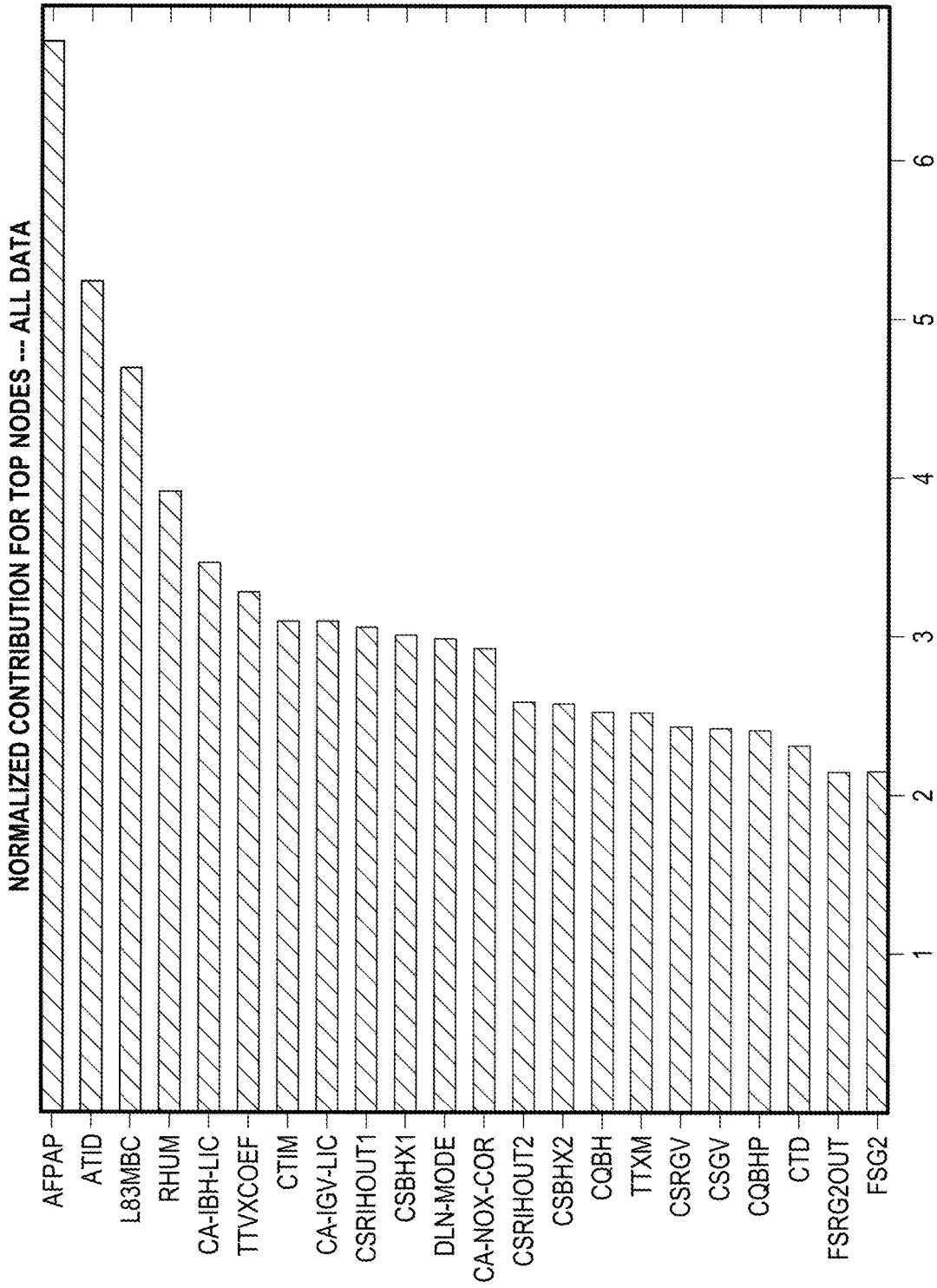
Figure 7C:
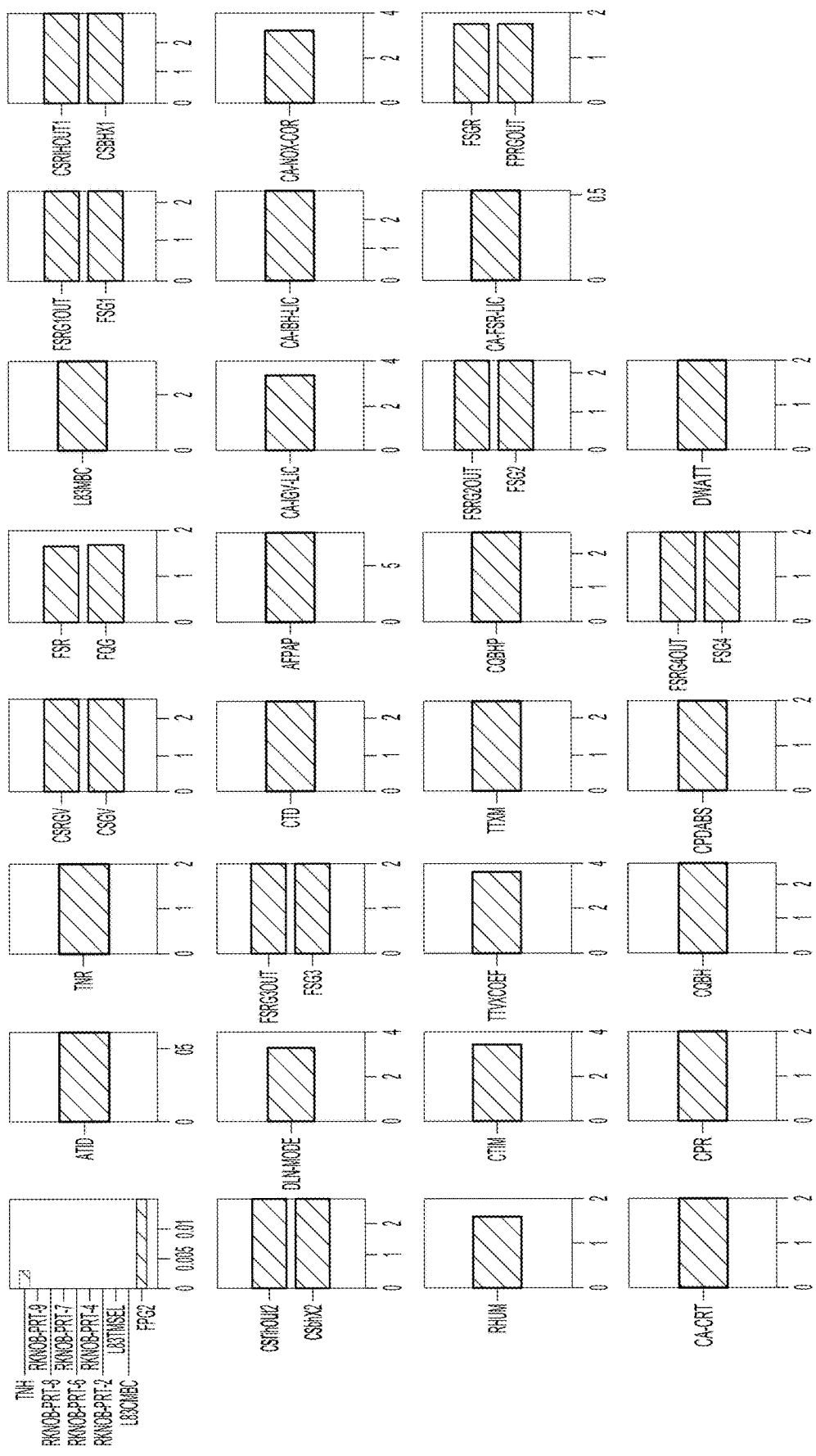
Figure 7D:
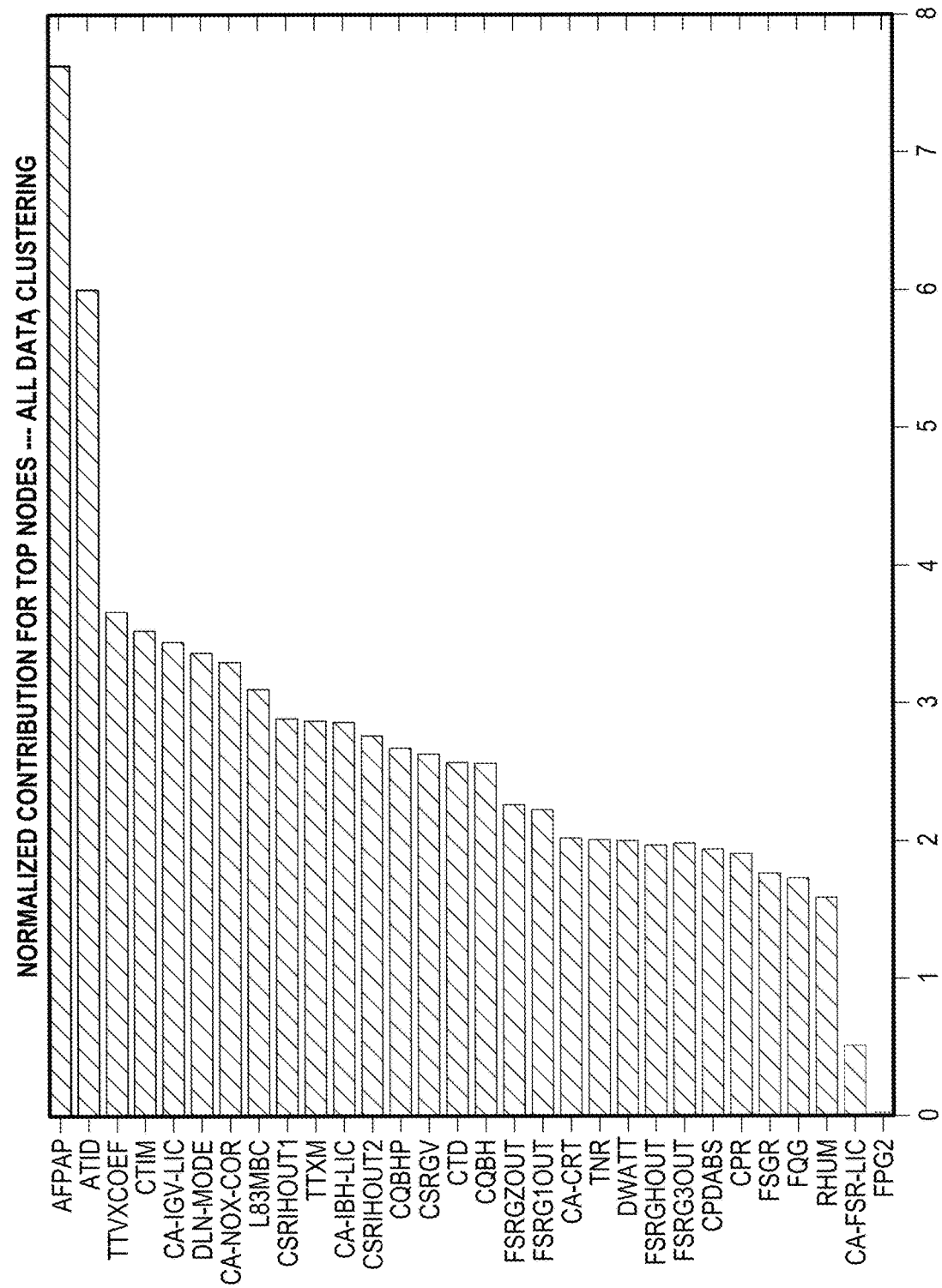
Figure 7E:
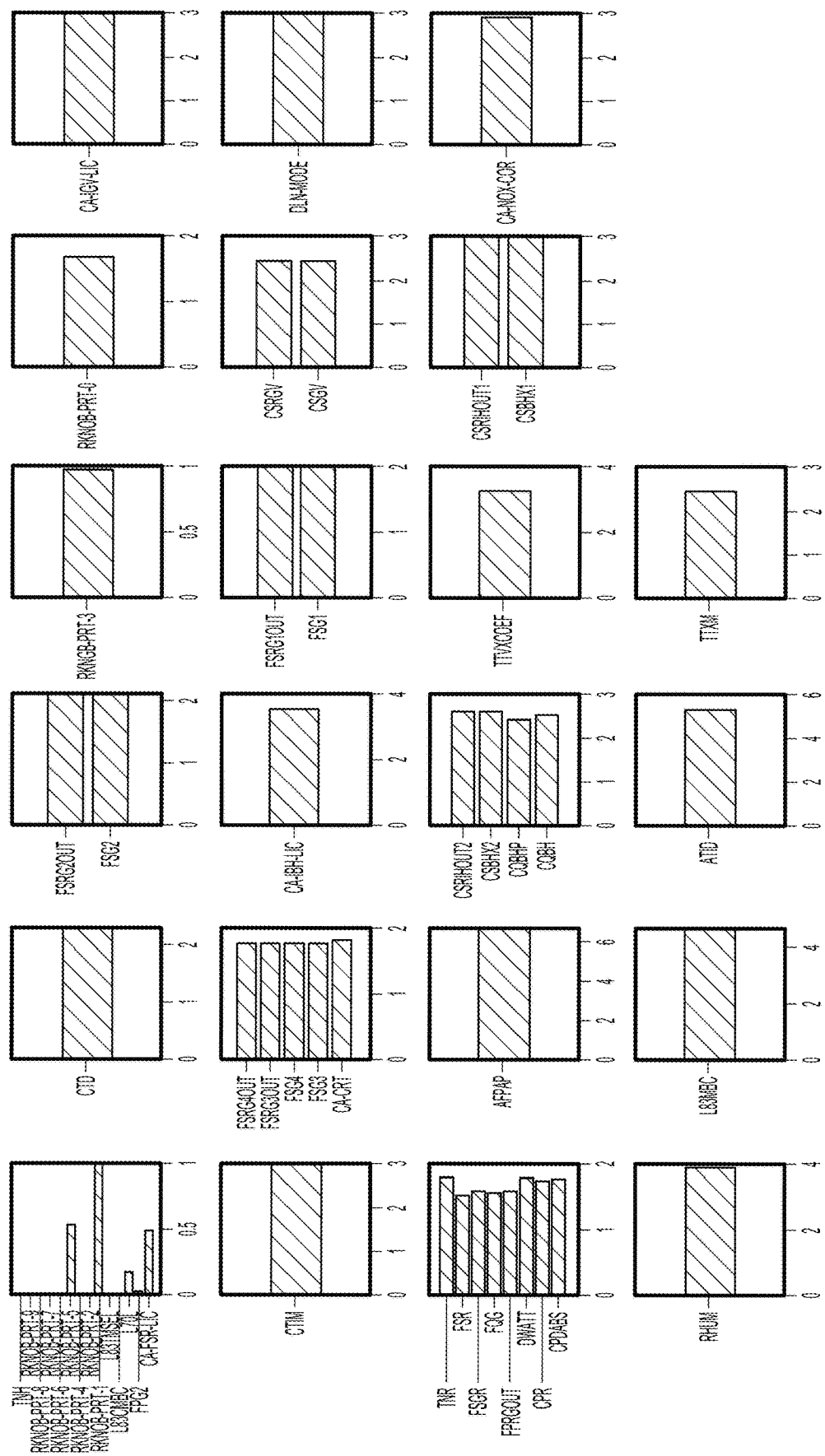
Figure 7F:
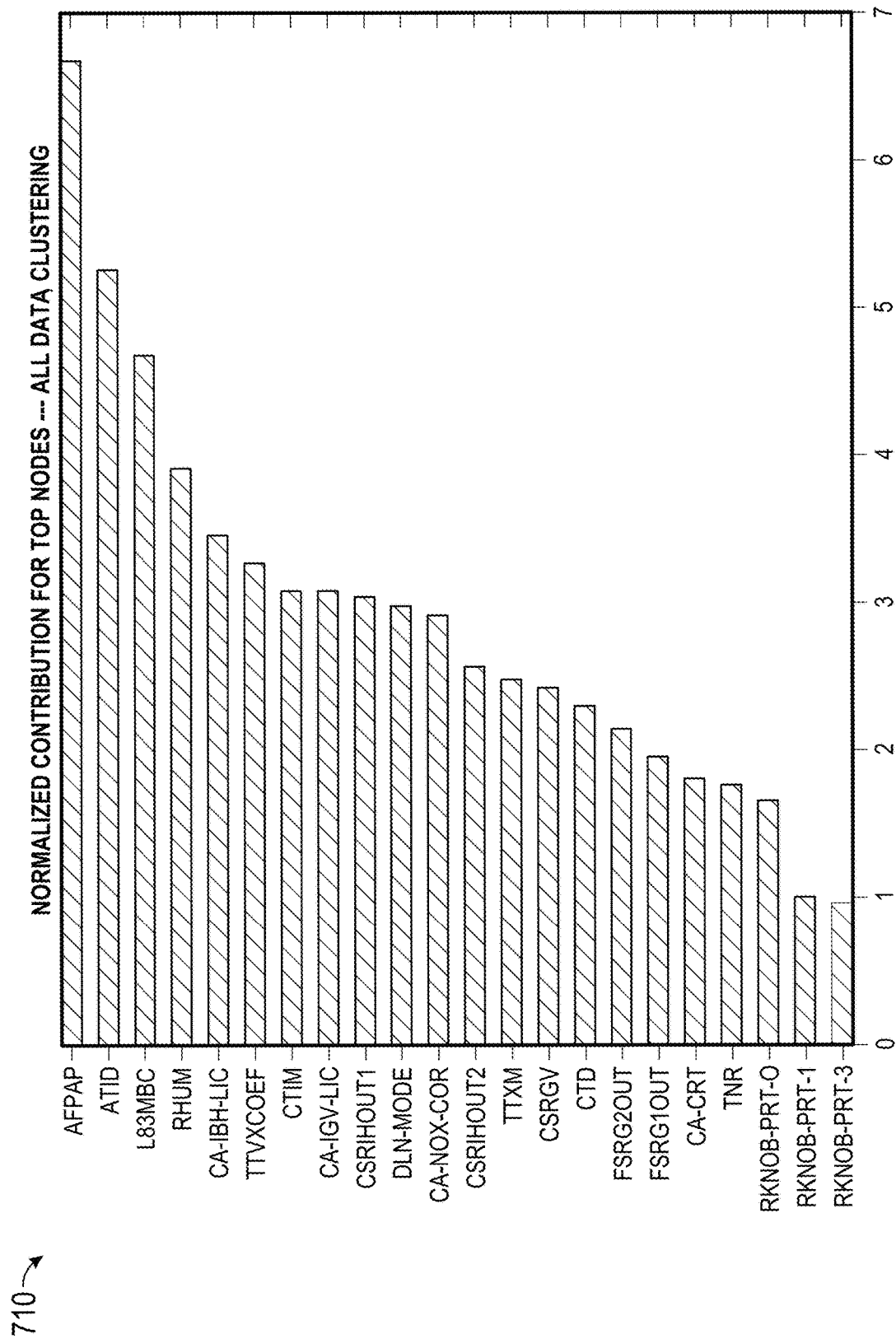
Figure 7G:
Figure 7H:
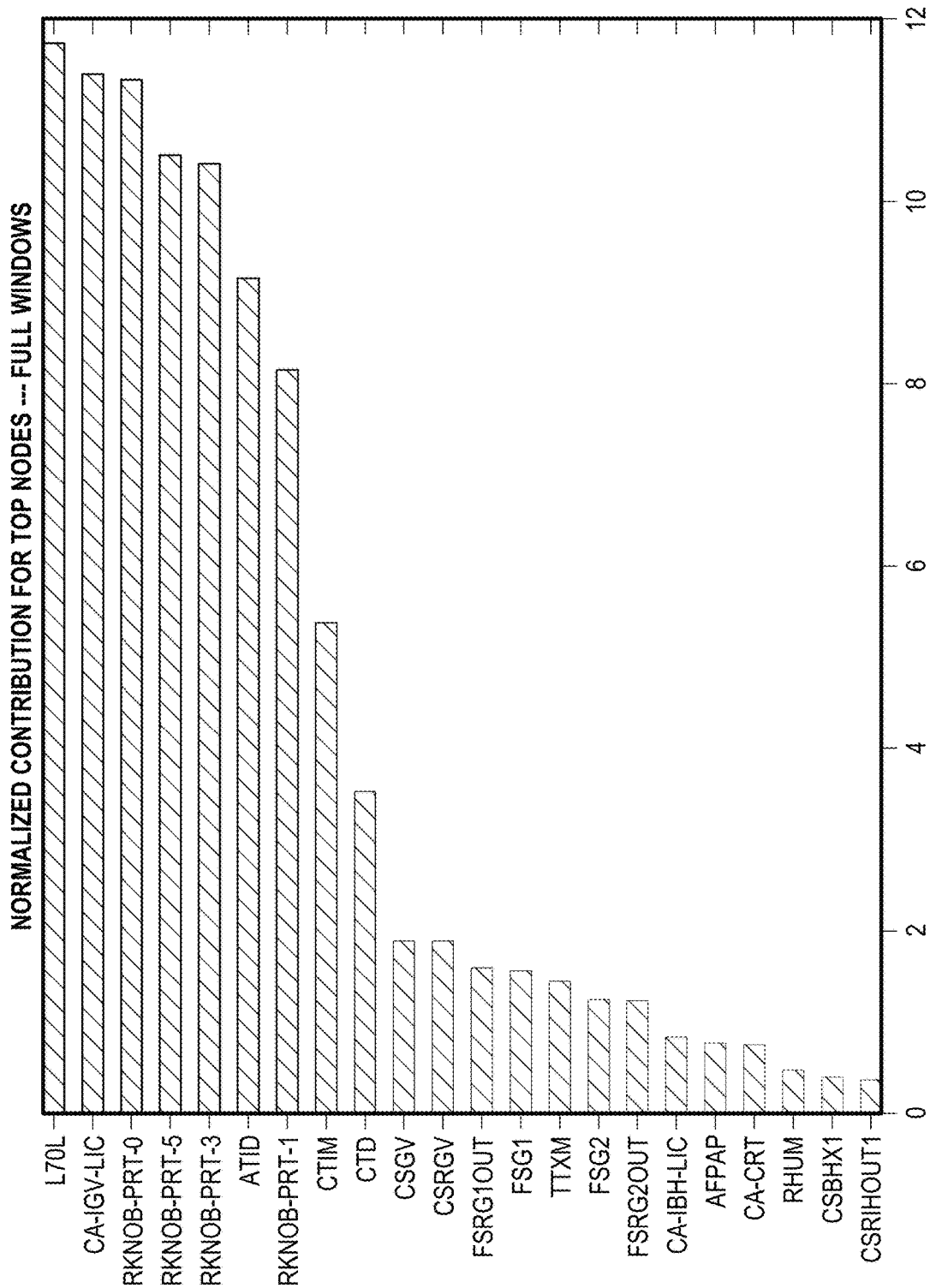
Figure 7I:
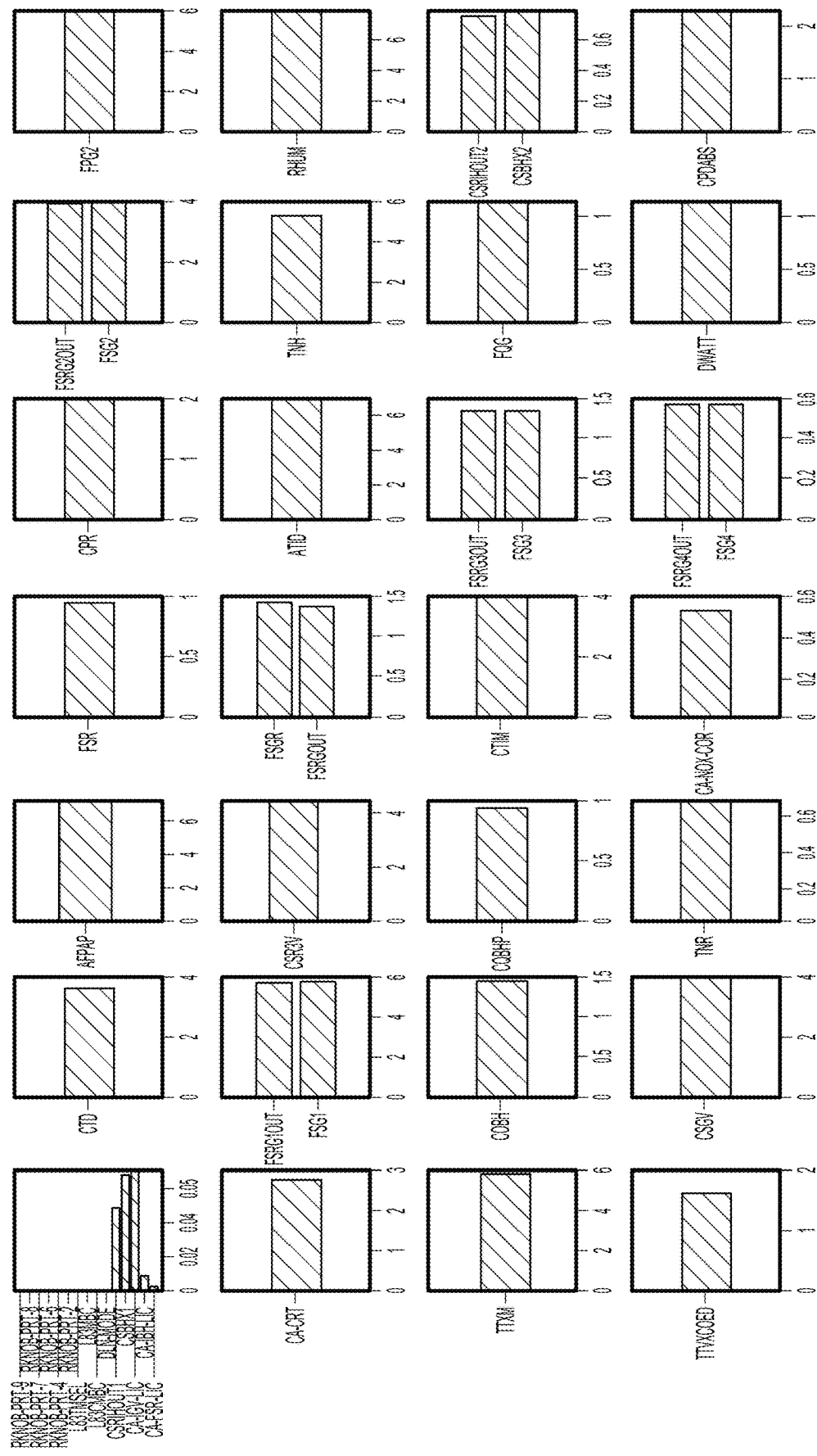
Figure 7J:
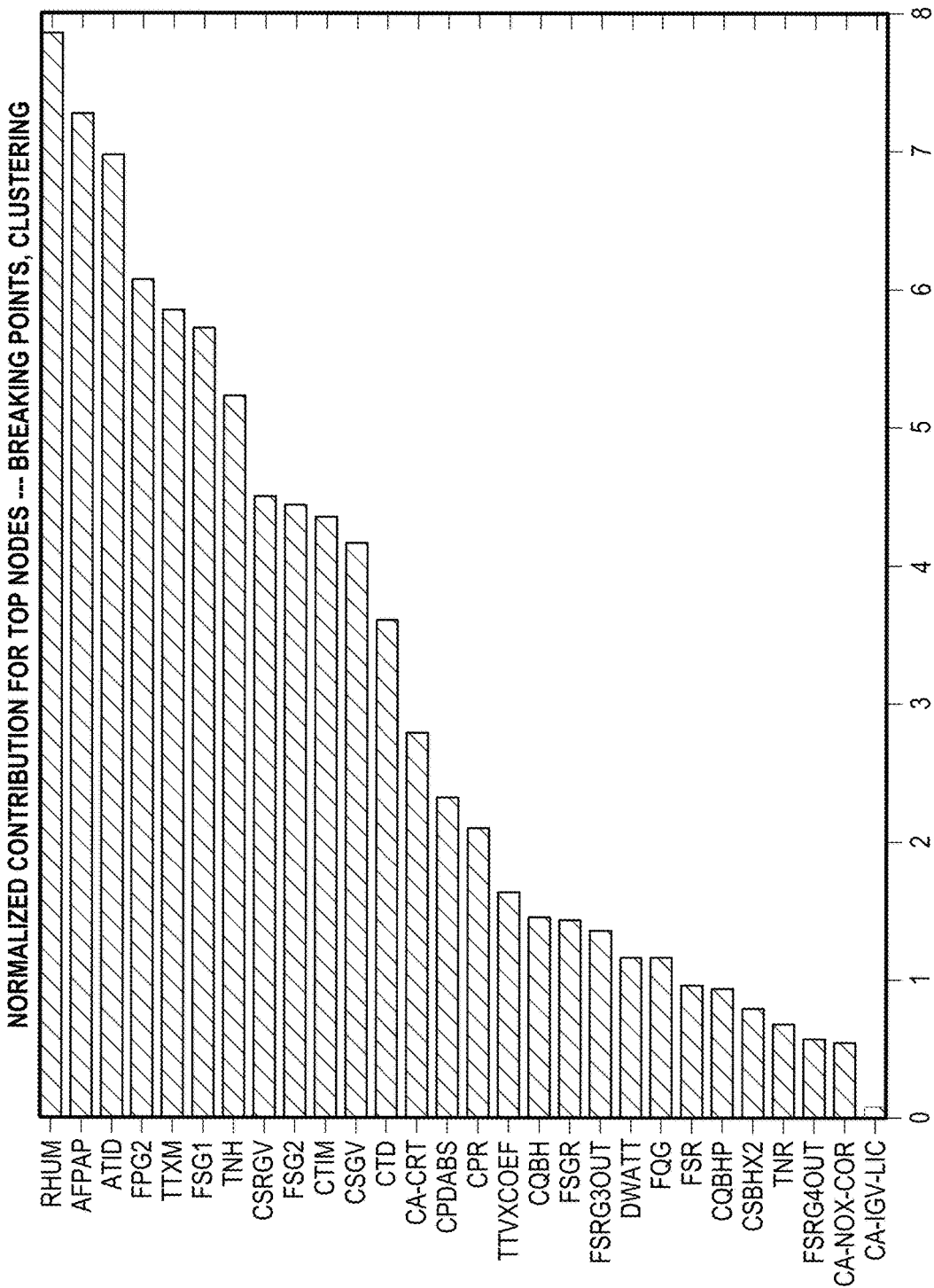
Figure 7K:
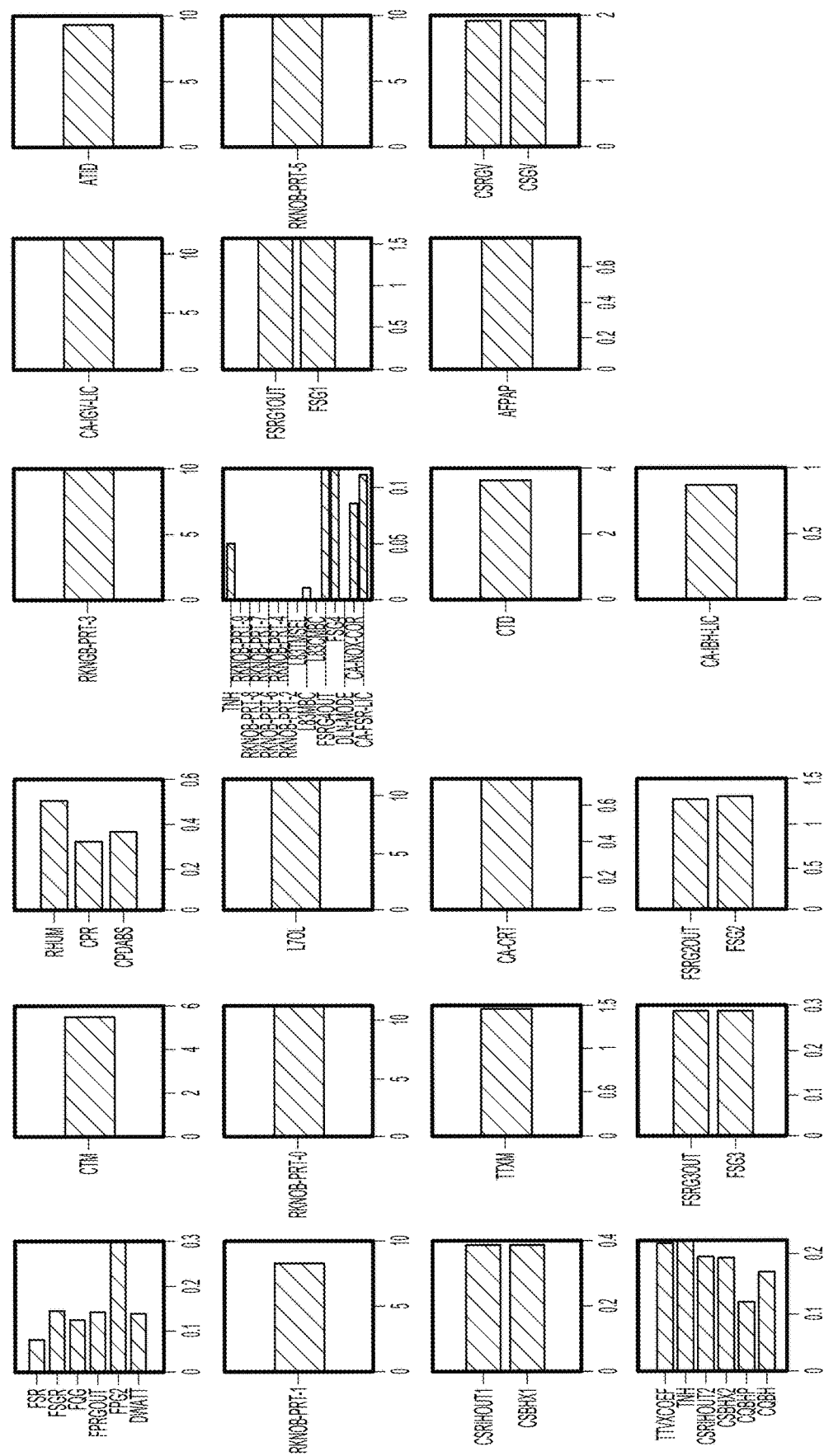
Figure 7L:
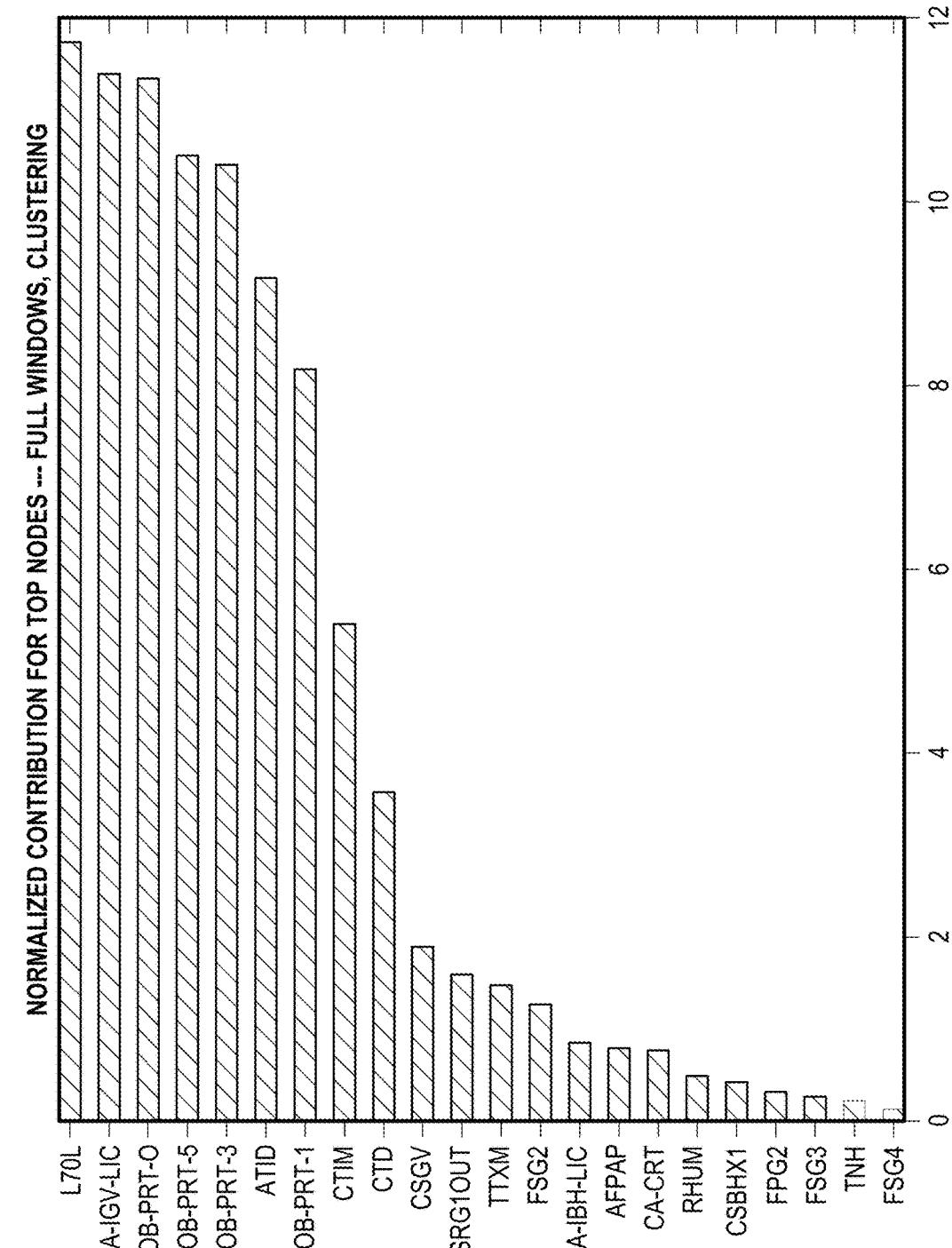

FIG. 7A shows an example graph plot 700 that show ranking for full data, without clustering, with preprocessing (all nodes). FIG. 7B shows an example graph plot 702 that shows ranking for full data, without clustering, no preprocessing (first 22 nodes). FIG. 7C shows an example graph plot 704 that shows ranking for full data, with clustering, with preprocessing (30 selected nodes), for each cluster. FIG. 7D shows an example graph plot 706 that shows ranking for full data, with clustering, with preprocessing (30 selected nodes), for all data. FIG. 7E shows an example graph plot 708 that shows ranking for full data, with clustering, without preprocessing (22 selected nodes), for each cluster. FIG. 7F shows an example graph plot 710 that shows ranking for full data, with clustering, without preprocessing (22 selected nodes), for all data. FIG. 7G shows an example graph plot 712 that shows ranking for time series within breaking points, without clustering, with preprocessing (all nodes). FIG. 7H shows an example graph plot 714 that shows ranking for separate individual runs, without clustering, without preprocessing (first 22 nodes). FIG. 7I shows an example graph plot 716 that shows ranking for time series within breaking points, with clustering, with preprocessing (30 selected nodes), for each cluster. FIG. 7J an example graph plot 718 that shows ranking for time series within breaking points, with clustering, with preprocessing (30 selected nodes), for all data. FIG. 7K shows an example graph plot 720 that shows ranking for separate individual runs, with clustering, without preprocessing (30 selected nodes), for each cluster. FIG. 7L shows an example graph plot 722 that shows ranking for separate individual runs, with clustering, without preprocessing (30 selected nodes), for all data. When compared to nodes selected by domain knowledge, preprocessing (e.g., smoothing, FFT, breaking points) provides better results especially when clustering is applied.

Example PCA-Based, Weighted Ranking on Load Sweep Data

In the description above, ranking was applied to normal runs data. Described herein are examples and results for weighted PCA-based ranking performed on load sweep data. The results are different than before which is expected since different conditions are used for generating the design of experiments (DOE) data.

The pipeline used here is very similar to the examples described above. For data extraction, raw data are loaded, normalized, and filtered and/or smoothened. No variables are discarded for this example. Some implementations perform, as is the case with this example, PCA-based weighted ranking. PCA is performed on time series data, and one final PCA is applied on the "weighted common" PCs. Windows of data are created that lie within breaking points. Breaking points are defined for each variable of the run when abrupt changes are identified. Then the time instances for the breaking points for the entire run are computed as a logical OR between the corresponding time instances of each variable. If the window size is large enough, PCA is performed. The common (average) axes are then found for all PCs of the used time series windows. If window sizes are too large, extra breaking points are added. For each of the approaches above, the contributions of the nodes are found in the following different ways: ranking based on the weighted norm of each variable on the loadings (PCs); clustering of the variables based on their loadings followed by ranking within each cluster based on the weighted norm of the loadings. In this way, only one node is selected from each cluster and redundant nodes are discarded.

Further details of the example are described herein. The maximum threshold for the data windows (800) was used on the basis that PCA considers linear correlations among variables. Hence, for long horizons, this metric may not describe the data accurately. Changing this hyperparameter generally affects ranking, although the selected nodes after clustering seem to not change much. This data set has very few variables (26) compared to normal run data and thus both data sets are not incorporated into the ranking algorithm.

For normalization, both load sweep and normal runs data are considered. To get a better estimate for the range of each variable, which are later normalized to [0, 1], all of the data (not just load sweep data) are considered. Different ranges give different normalization outcomes, which may give different magnitudes of variabilities within each window. When normalization is complete, normal runs data are discarded. For this example, only one run is included in the data set, which has a very long horizon.

Figure 8A:
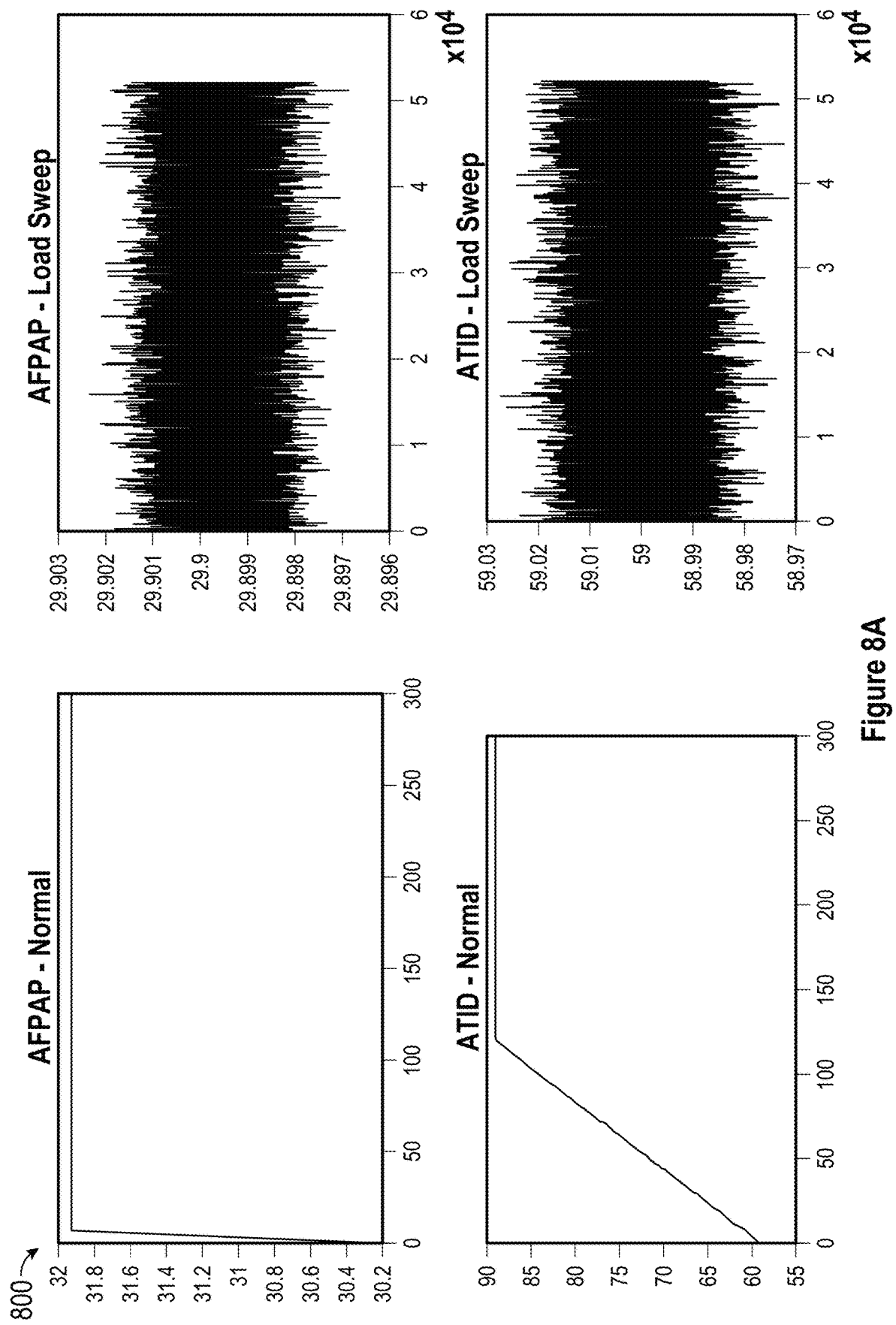
FIGS. 8A and 8B shows example graph plots for different variables, according to some implementations.
Figure 8B:
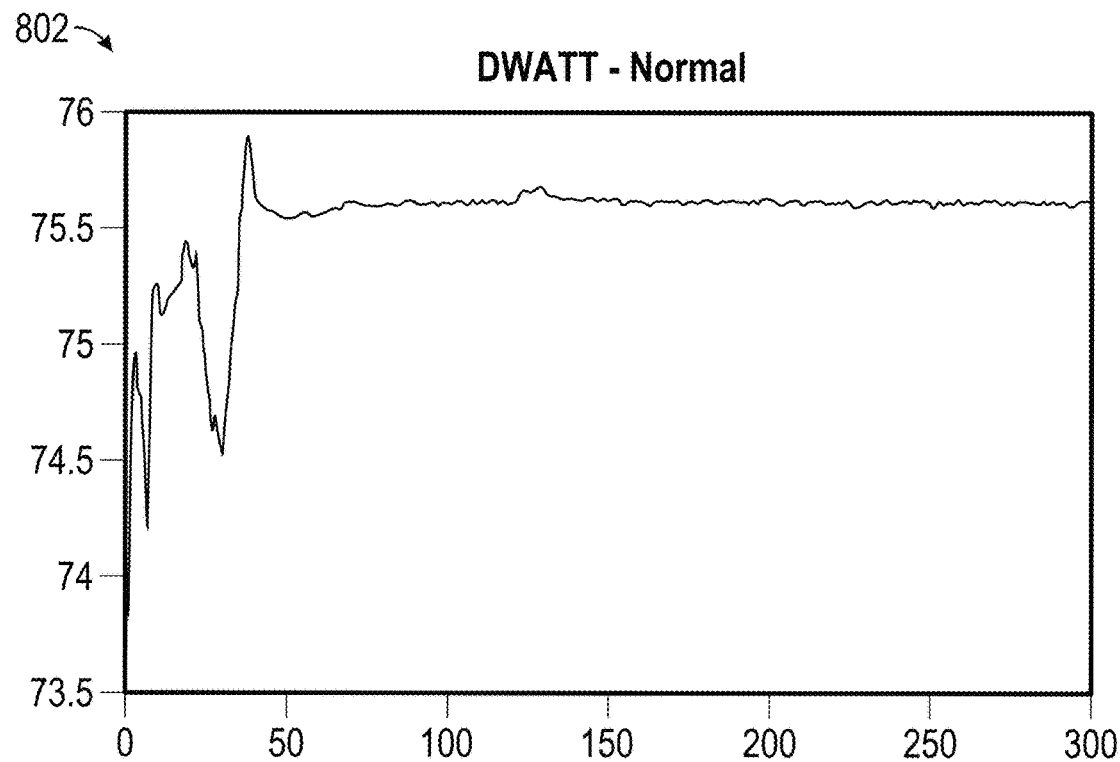
Figure 8B:
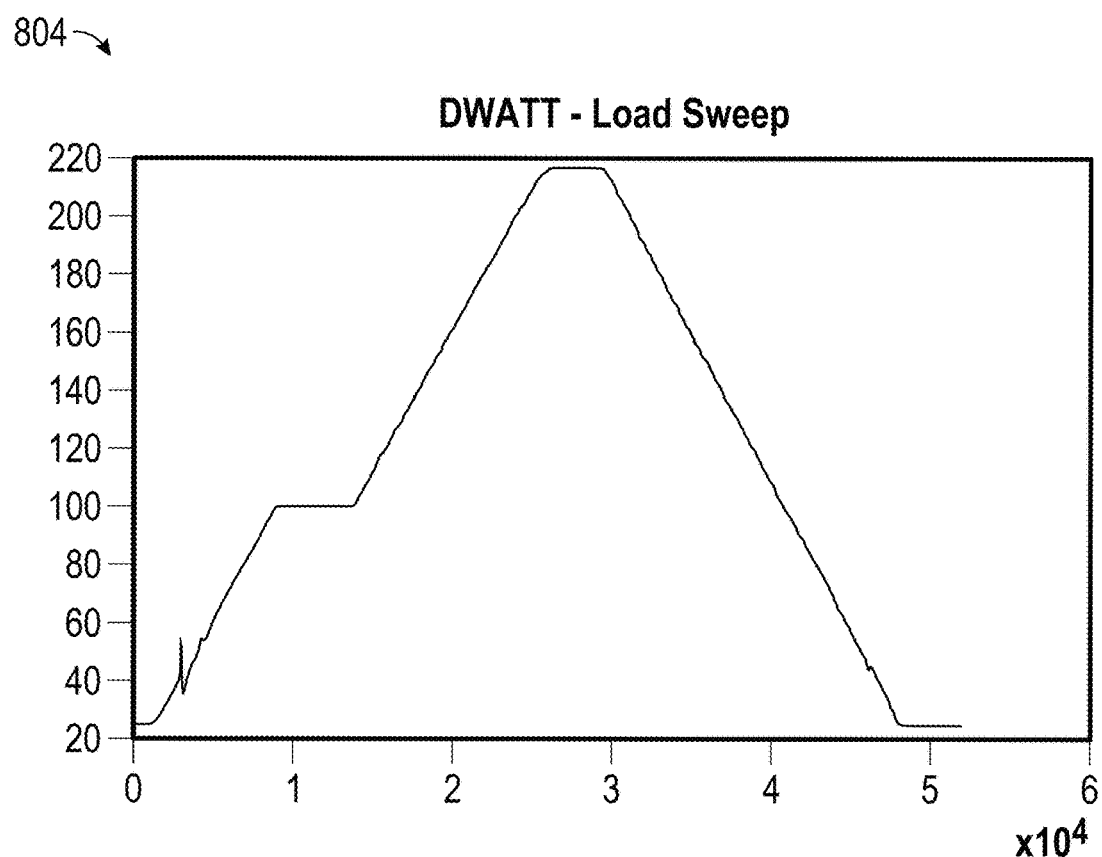

Based on experiments, both normal and load sweep data may be considered together for ranking, since each set has different characteristics. In particular, certain variables have significantly different variability for the different datasets which affects ranking. FIG. 8A shows example graph plots 800 for two variables AFPAP and ATID (graphs on the left show plots for normal data and the graphs on the right show graph plots for load sweep), and FIG. 8B shows example graph plots for a variable DWATT (graph 802 on the top shows a plot for normal data and graph 804 on the bottom shows a graph plot for load sweep), according to some implementations. Some implementations consider the effect of the maximum threshold for window sizes.

Figure 9A:
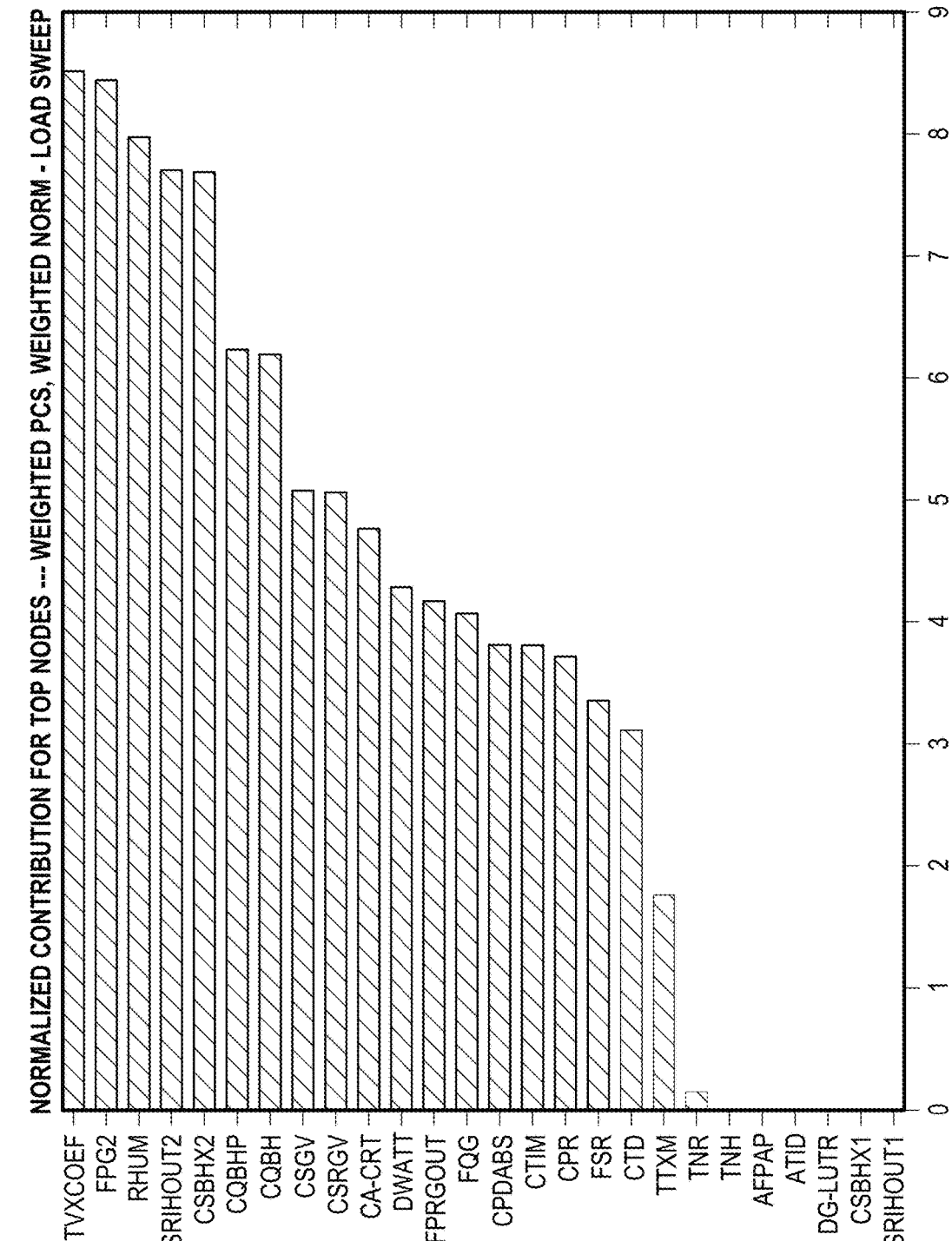
FIG. 9A shows an example graph plot that shows ranking for weighted PCs, weighted norm, for load sweep, according to some implementations.
Figure 9B:
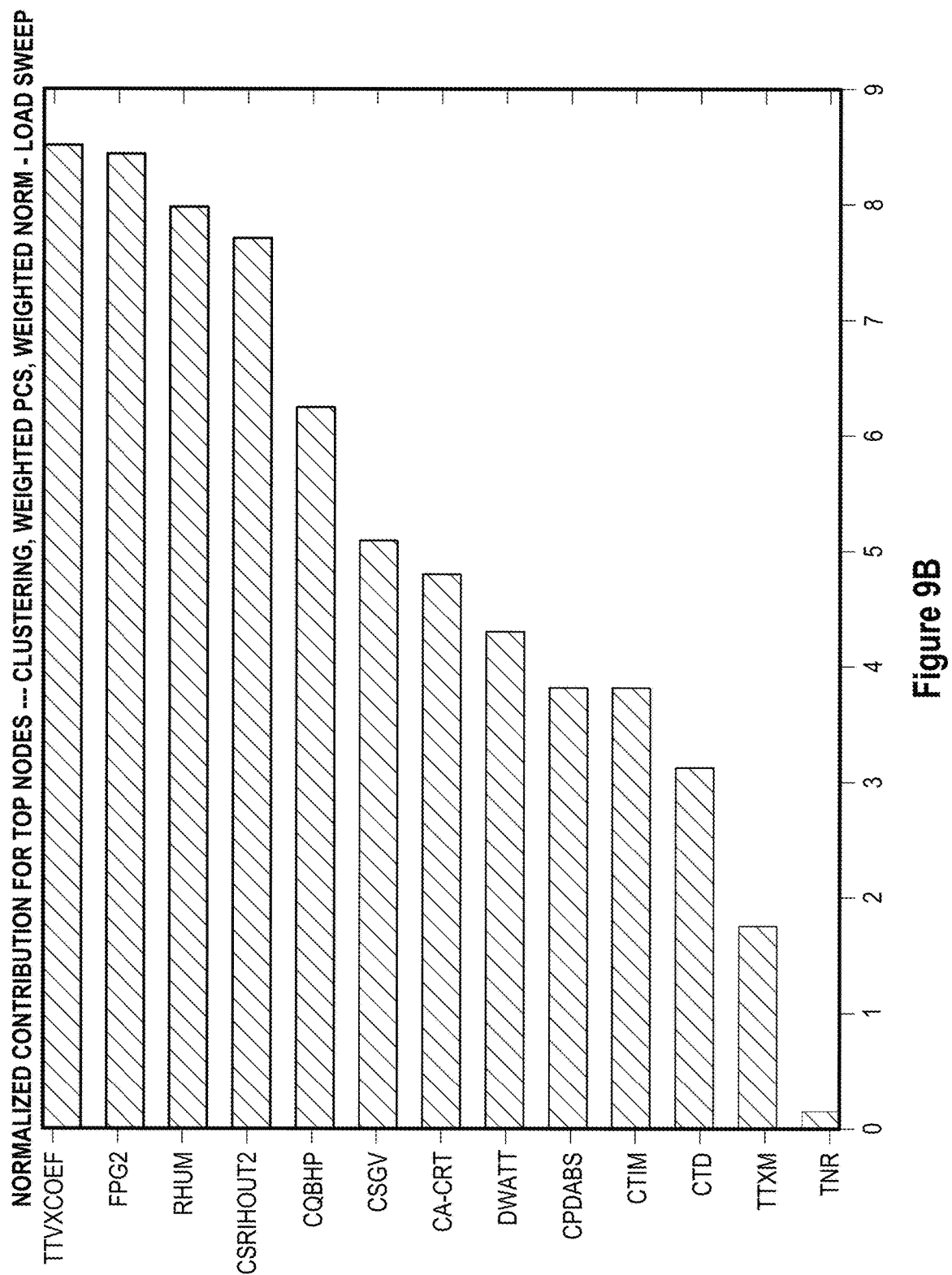
FIG. 9B shows an example graph plot that shows ranking for weighted PCs, weighted norm, for load sweep, with clustering, according to some implementations.
Figure 9C:
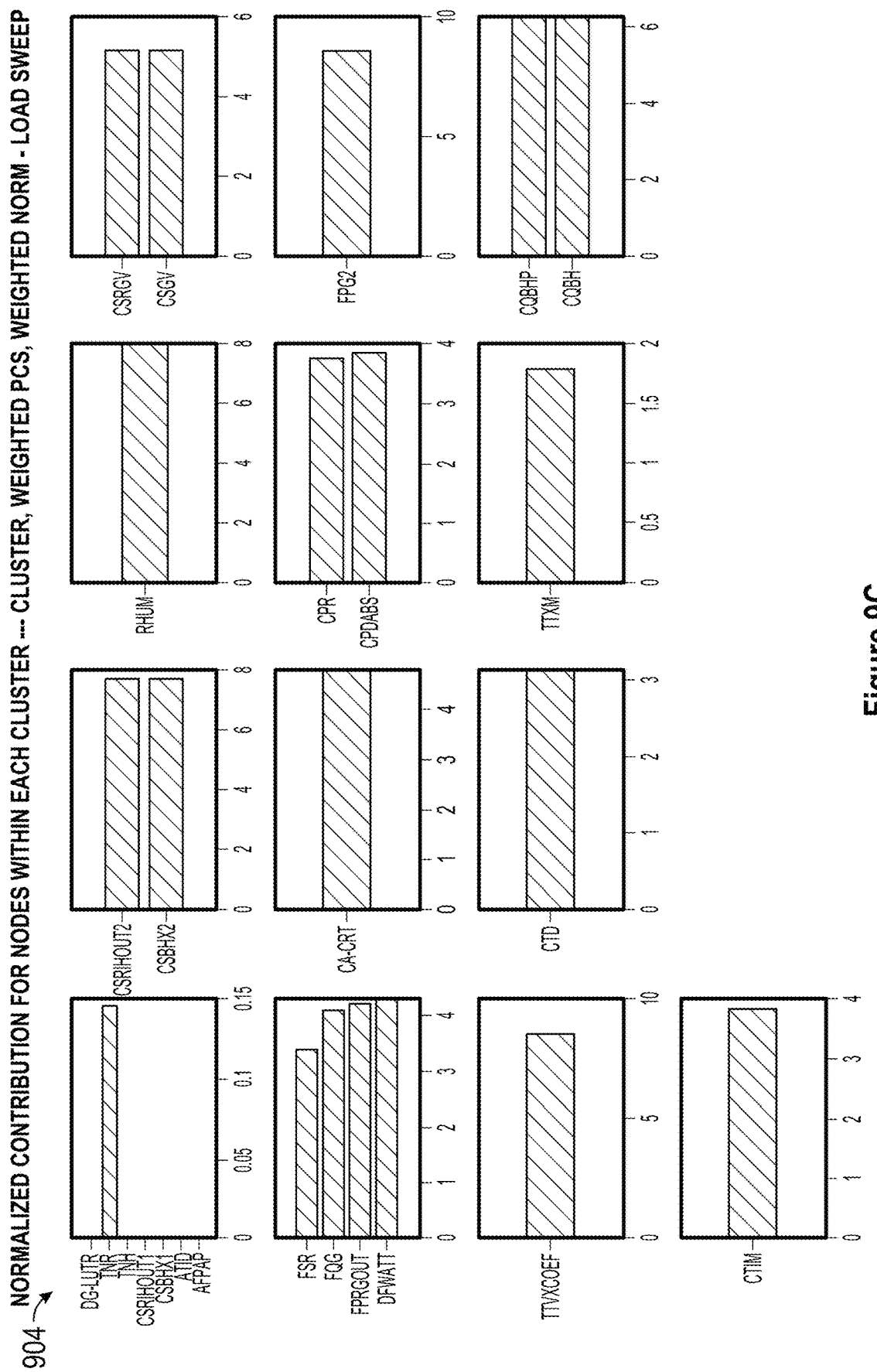
FIG. 9C shows an example graph plot that shows ranking for weighted PCs, weighted norm, for load sweep, with clustering, within each cluster, according to some implementations.
Figure 9D:
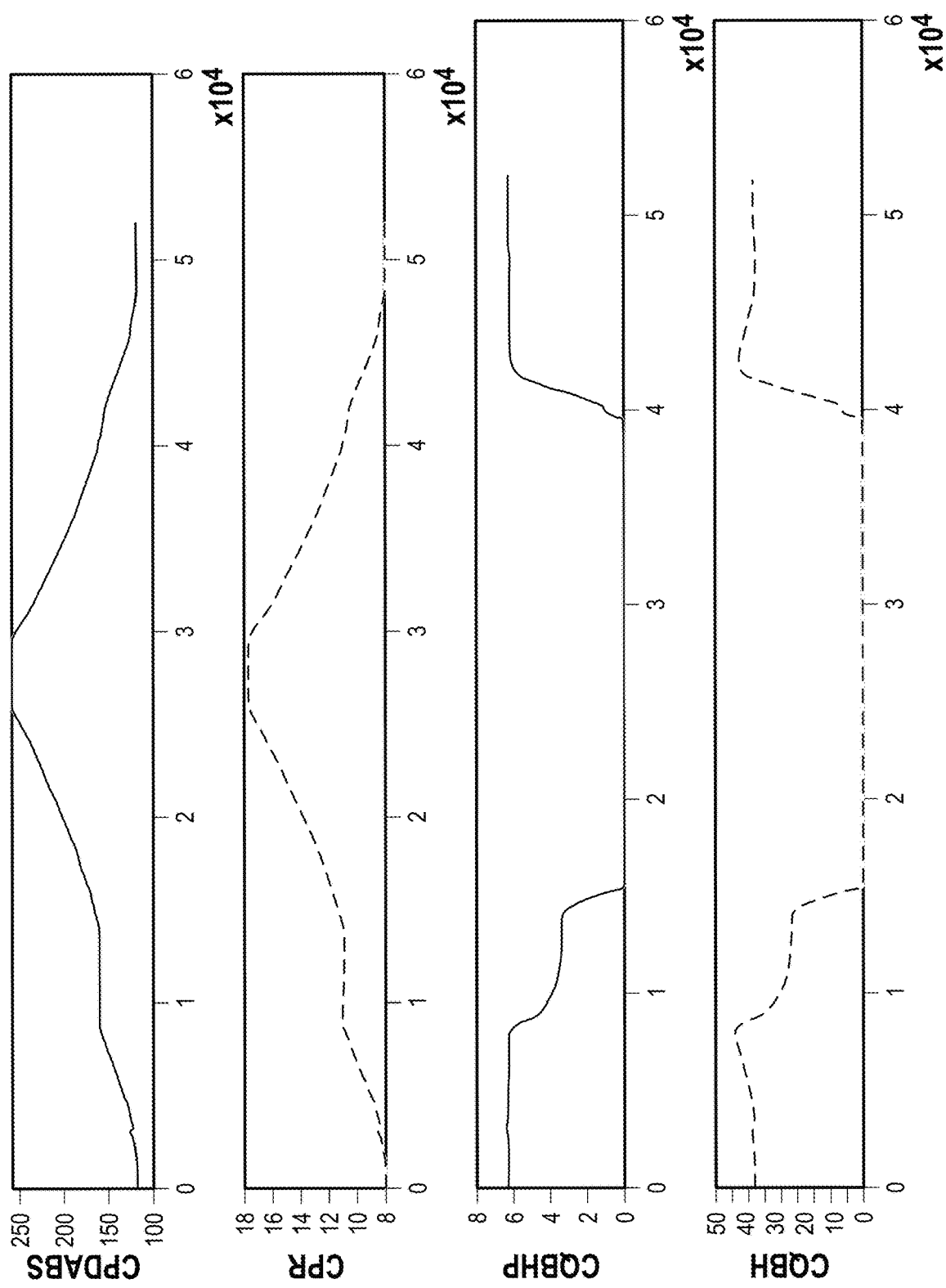
FIGS. 9D and 9E show example graph plots for different variables, according to some implementations.
Figure 9E:
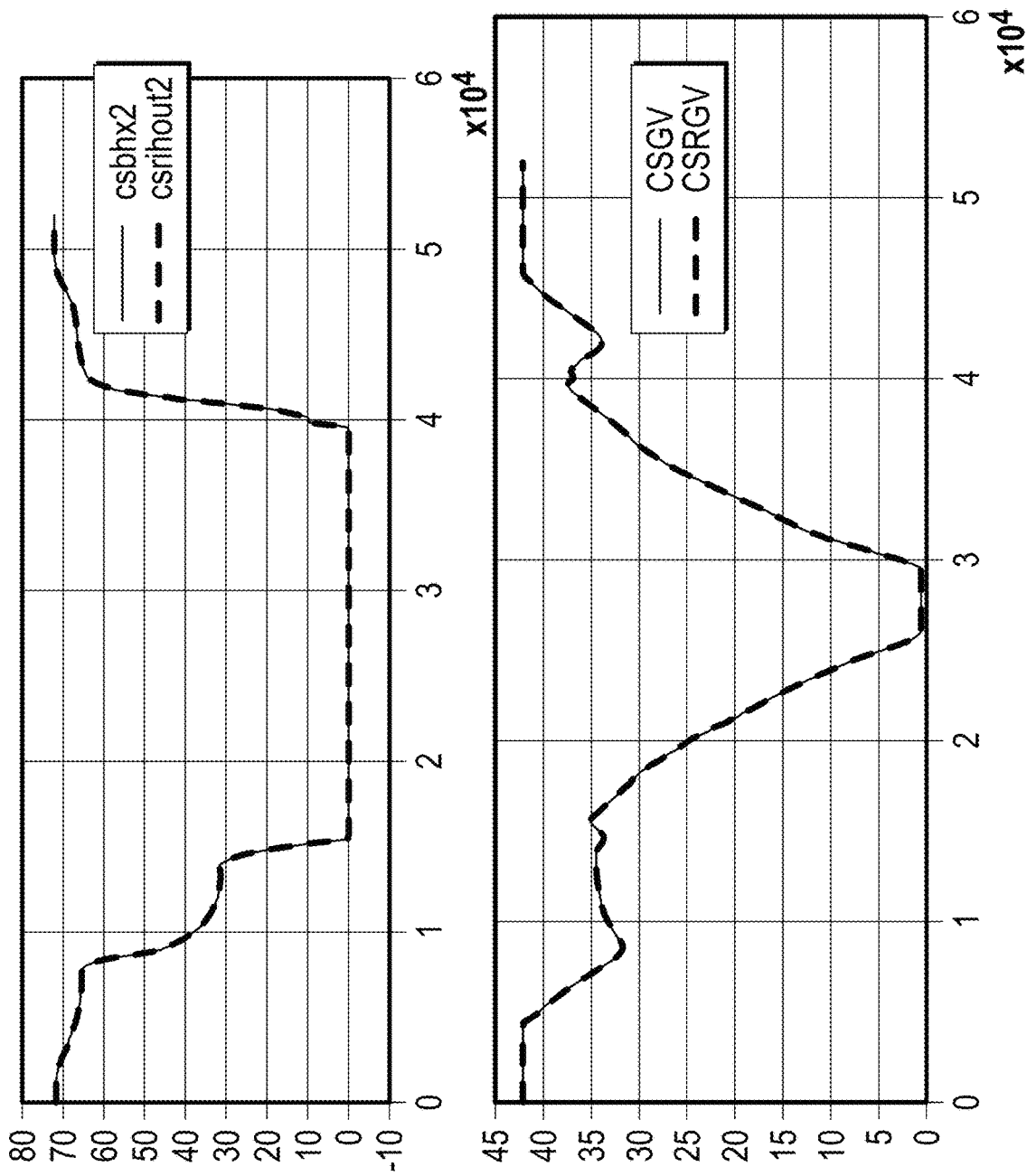

FIG. 9A shows an example graph plot 900 that shows ranking for weighted PCs, weighted norm, for load sweep. FIG. 9B shows an example graph plot 902 that shows ranking for weighted PCs, weighted norm, for load sweep, with clustering. FIG. 9C shows an example graph plot 904 that shows ranking for weighted PCs, weighted norm, for load sweep, with clustering, within each cluster. Clustering discarded variables that have similar patterns to more dominant ones, examples of which are shown in graph plots 906 and 908 shown in FIGS. 9D and 9E, for different variables, according to some implementations.

Figure 10:
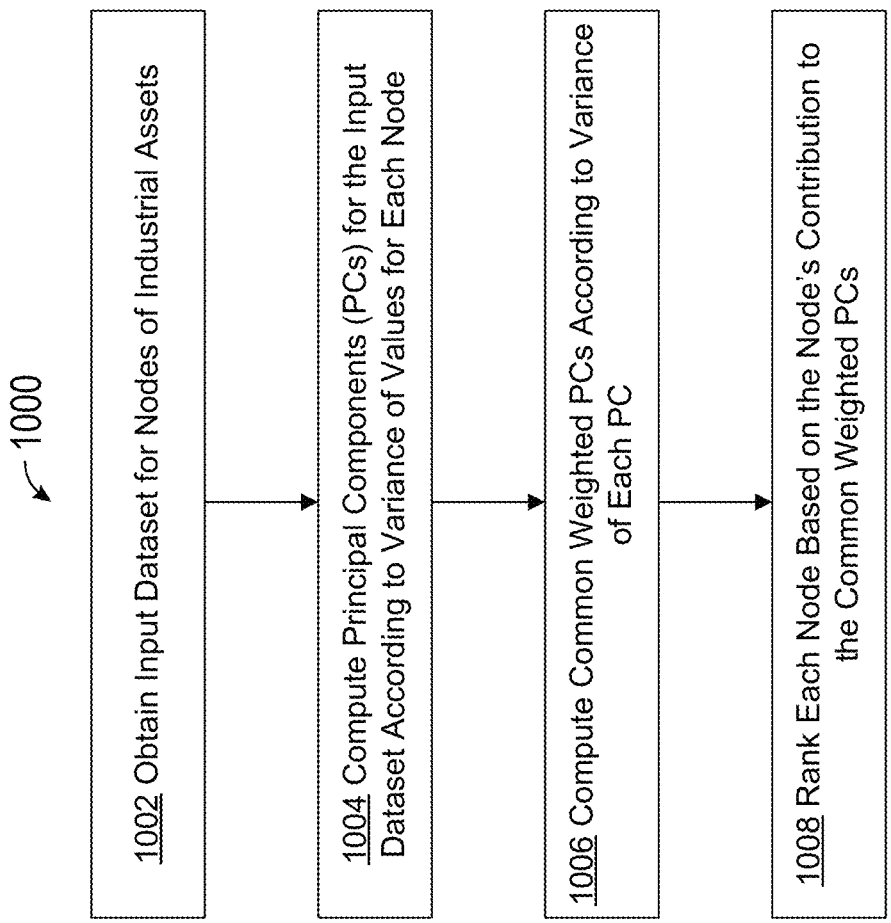
FIG. 10 shows a flowchart of an example method for node selection and ranking for attack detection and localization in cyber-physical systems, according to some implementations.

FIG. 10 shows a flowchart of an example method 1000 for node selection and ranking for attack detection and localization in cyber-physical systems, according to some implementations. The method 1000 can be executed on a computing device (e.g., the computer 106) that is connected to industrial assets (e.g., the assets 102). The method includes obtaining (1002) (e.g., using the module 112) an input dataset of values for a plurality of nodes (e.g., the nodes 104; e.g., sensors, actuators, controllers, software nodes) of industrial assets (e.g., the assets 102). The method also includes computing (1004) a plurality of principal components (PCs) for the input dataset (e.g., using the module 114) according to variance of values for each node. The method also includes computing (1006) a set of common weighted PCs (e.g., using the weighted PC module 116) based on the plurality of PCs according to variance of each PC. The method also includes ranking (1008) each node (e.g., using the ranking module 118) based on the node's contribution to the set of common weighted PCs.

In some implementations, the input dataset includes g groups of multivariate time series (MTS) data items $X_t \in \mathbb{R}^{n_i * p}$, t=1, . . . , g, where $n_i$ is the number of observations for each group, and p is the number of nodes. In some implementations, each group is represented by its first k PCs with each PC axis being denoted by $z_i^{(t)} \in \mathbb{R}^p$, with i=1, . . . , k, t=1, . . . , g, and 1≤k≤p. In some implementations, the set of common weighted PCs is computed by performing eigen-decomposition on the matrix $H_w = \Sigma_{t=1}^{g} L_t^T W_t L_t \geq 0$ to determine a set of common axes according to the variance of each PC of the different subspaces described by $L_t$, t=1, . . . , g, wherein $W_t$=diag$([w_1^{(t)}, \ldots, w_k^{(t)}]) \in \mathbb{R}^{k*k}$ is the weighting matrix, where $w_i^{(t)} \geq 0$ is proportional to the variance $\sigma_i^{(t)} \geq 0$ of the i-th PC belonging to the t-th group. In some implementations, $w_i^{(t)} = \sigma_i^{(t)}$. In some implementations, $w_i^{(t)} = \sigma_i^{(t)} / \Sigma_{i,t} \sigma_i^{(t)}$.

In some implementations, each node's contribution comprises weighted norm of value corresponding to the node on the set of common weighted PCs.

In some implementations, the method further includes: clustering and ranking nodes within each cluster, based on weighted norm of value corresponding to each node on the set of common weighted PCs, thereby selecting a node from each cluster and discarding other nodes of the cluster. In some implementations, clustering refers to the process of grouping together variables with similar loading patterns, and subsequently selecting only one "representative" node from each cluster. Clustering is thus performed with respect to the loading vector (i.e., "contribution" vector) of each variable on the common principal component axes. This is done to avoid using variables that may be highly correlated. The selection of the representative vector from each cluster is performed by ranking the magnitude of the (weighted) contribution of each grouped variable (node) and selecting the one with the highest score.

In some implementations, the input dataset includes normal runs data and load sweep data.

In some implementations, obtaining the input dataset includes normalizing the input dataset to a predetermined range of values. In some implementations, the predetermined range is [0, 1]. In some implementations, the method further includes: selecting the predetermined range based on magnitudes of variabilities within each window, wherein the input dataset includes a plurality of windows. In some implementations, the input dataset includes normal runs data and load sweep data, and the method further includes: discarding the normal runs data after normalization.

In some implementations, the method further includes: using the high-ranking nodes as inputs to anomaly detection systems or as secured hardened nodes to be the anchors for cyber-attack neutralization signal reconstruction (e.g., hardened sensors as anchors in the virtual sensing for neutralization). The hardened sensors are system anchors that remain uncompromised and may be used as ground truth healthy information for reconstructing the compromised sensor measurements, e.g. in a virtual sensing framework.

In some implementations, wherein the input dataset includes multivariate time series (MTS) data items for a plurality of runs. In some implementations, a run refers to an individual simulation of the system which corresponds to a particular set of initial conditions and inputs. It also includes the full (time-series) response of the system until steady state is reached). In some implementations, the method further includes: defining breaking points for each node for each run based on identifying abrupt changes in values for the node (abrupt changes are typically observed on logical nodes that do not measure a physical process/signal, but correspond to the (de-)activation of a particular mode of the asset's operation. For example, certain logical nodes can switch instantaneously between 0 and 1, depending on the mode of the model-based controller being used); defining windows for the input dataset based on the breaking points; and in accordance with a determination that size of the windows is larger than a predetermined threshold (e.g., 800), defining additional breakpoints for the input dataset.

In some implementations, the plurality of nodes are not physically co-located or are communicatively coupled via a network (i.e., wired or wireless network, such as an IoT over 5G/6G or Wi-Fi 6).

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A computer-implemented method for node selection and ranking in a cyber-physical system, the method comprising:
   obtaining an input dataset of values for a plurality of nodes of industrial assets, the input dataset comprising a number of groups of multivariate time series (MTS) data items, each group represented by a number of observations related to a number of nodes, wherein the plurality of nodes are physically co-located or connected through a wired or wireless network;
   computing a plurality of principal components (PCs) for the input dataset according to variance of values for each node;
   computing a set of common weighted PCs based on the plurality of PCs according to variance of each PC; and
   ranking each node based on the node's contribution to the set of common weighted PCs.

2. The method of claim 1, wherein the number of groups of MTS data items are represented as $X_t \in \mathbb{R}^{n_i * p}$, $t=1, \ldots, g$, where g is the number of groups of MTS data items, $n_i$, is the number of observations for each group, and p is the number of nodes.

3. The method of claim 2, wherein each group is represented by its first k PCs with each PC axis being denoted by $z_i^{(t)} \in \mathbb{R}^p$, with $i=1, \ldots, k$, $t=1, \ldots, g$, and $1 \le k \le p$.

4. The method of claim 3, wherein the set of common weighted PCs is computed by performing eigen-decomposition on the matrix $H_w = \Sigma_{t=1}^g L_t^T W_t L_t \ge 0$ to determine a set of common axes according to the variance of each PC of the different subspaces described by $L_t$, $t=1, \ldots, g$, wherein $W_t = \text{diag}([w_1^{(t)}, \ldots, w_k^{(t)}]) \in \mathbb{R}^{k*k}$ is the weighting matrix, where $w_i^{(t)} \ge 0$ is proportional to the variance $\sigma_i^{(t)} \ge 0$ of the i-th PC belonging to the t-th group.

5. The method of claim 4, wherein $w_i^{(t)} = \sigma_i^{(t)}$.

6. The method of claim 4, wherein $w_i^{(t)} = \sigma_i^{(t)} / \Sigma_{i,t} \sigma_i^{(t)}$.

7. The method of claim 1, wherein each node's contribution comprises weighted norm of value corresponding to the node on the set of common weighted PCs.

8. The method of claim 1, wherein the plurality of PCs are computed based on kernel principal component analysis, which includes computing the plurality of PCs based on nonlinear kernel functions in the input space, and the set of common weighted PCs is computed based on a finite-dimensional optimization problem in accordance with a Gram matrix of the input dataset.

9. The method of claim 1, further comprising:
   clustering and ranking nodes within each cluster, based on a weighted norm of a value corresponding to each node on the set of common weighted PCs, thereby selecting a node from each cluster and discarding other nodes of the cluster.

10. The method of claim 1, wherein the input dataset includes normal runs data and load sweep data.

11. The method of claim 1, wherein obtaining the input dataset comprises normalizing the input dataset to a predetermined range of values.

12. The method of claim 10, wherein the predetermined range is [0, 1].

13. The method of claim 10, further comprising:
   selecting the predetermined range based on magnitudes of variabilities within each window, wherein the input dataset includes a plurality of windows.

14. The method of claim 10, wherein the input dataset includes normal runs data and load sweep data, the method further comprising:
   discarding the normal runs data after normalization.

15. The method of claim 1, further comprising:
   using the high-ranking nodes as inputs to anomaly detection systems or as secured hardened nodes to be the anchors for neutralization signal reconstruction.

16. The method of claim 1, wherein the plurality of nodes are not physically co-located or are communicatively coupled via a network.

17. The method of claim 1, wherein the input dataset includes multivariate time series (MTS) data items for a plurality of runs, the method further comprising:
   defining breaking points for each node for each run based on identifying abrupt changes in values for the node; and
   defining windows for the input dataset based on the breaking points; and
   in accordance with a determination that size of the windows is larger than a predetermined threshold, defining additional breakpoints for the input dataset.

18. A system for implementing node selection and ranking in a cyber-physical system, comprising:
   one or more processors;
   memory; and
   one or more programs stored in the memory, wherein the one or more programs are configured for execution by the one or more processors and include instructions for:
   obtaining an input dataset of values for a plurality of nodes of industrial assets, the input dataset comprising a number of groups of multivariate time series (MTS) data items, each group represented by a number of observations related to a number of nodes, wherein the plurality of nodes are physically co-located or connected through a wired or wireless network;

computing a plurality of principal components (PCs) for the input dataset according to variance of values for each node;

computing a set of common weighted PCs based on the plurality of PCs according to variance of each PC; and ranking each node based on the node's contribution to the set of common weighted PCs.

19. The system of claim 18, wherein the plurality of PCs are computed based on kernel principal component analysis, which includes computing the plurality of PCs based on nonlinear kernel functions in the input space, and the set of common weighted PCs is computed based on a finite-dimensional optimization problem in accordance with a Gram matrix of the input dataset.

20. A non-transitory computer-readable storage medium storing one or more programs for execution by one or more processors of an electronic device, the one or more programs including instructions for:

obtaining an input dataset of values for a plurality of nodes of industrial assets, the input dataset comprising a number of groups of multivariate time series (MTS) data items, each group represented by a number of observations related to a number of nodes, wherein the plurality of nodes are physically co-located or connected through a wired or wireless network;

computing a plurality of principal components (PCs) for the input dataset according to variance of values for each node;

computing a set of common weighted PCs based on the plurality of PCs according to variance of each PC; and ranking each node based on the node's contribution to the set of common weighted PCs.

* * * * *